United States Patent
Abe et al.

(10) Patent No.: US 10,521,122 B2
(45) Date of Patent: Dec. 31, 2019

(54) STORAGE APPARATUS AND METHOD OF CONTROLLING SAME

(71) Applicant: HITACHI, LTD., Tokyo (JP)

(72) Inventors: Takahiro Abe, Tokyo (JP); Ran Ogata, Tokyo (JP); Atsushi Sutoh, Tokyo (JP); Kensuke Narita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/123,738

(22) Filed: Sep. 6, 2018

(65) Prior Publication Data
US 2019/0235755 A1     Aug. 1, 2019

(30) Foreign Application Priority Data
Jan. 26, 2018 (JP) ................. 2018-011882

(51) Int. Cl.
*G06F 3/06* (2006.01)
*G06F 12/02* (2006.01)
*G06F 12/00* (2006.01)

(52) U.S. Cl.
CPC ............ *G06F 3/061* (2013.01); *G06F 3/0608* (2013.01); *G06F 3/0653* (2013.01);
(Continued)

(58) Field of Classification Search
CPC .................................. G06F 3/06; G06F 12/00
(Continued)

(56) References Cited

U.S. PATENT DOCUMENTS 9,052,938 B1 * 6/2015 Bhide ................. G06F 9/45533

2006/0212625 A1 * 9/2006 Nakagawa ............ G06F 3/0608
710/68
(Continued)

FOREIGN PATENT DOCUMENTS

JP    2006-259962 A    9/2006
JP    5216915 B    3/2013
(Continued)

OTHER PUBLICATIONS

Japanese Office Action dated Jun. 11, 2019 for the Japanese Patent Application No. 2018-011882.

*Primary Examiner* — Christopher B Shin
(74) *Attorney, Agent, or Firm* — Volpe and Koenig, P.C.

(57) ABSTRACT

A storage apparatus and method of controlling same which, while preventing depletion of a storage area due to the generation of garbage, also prevent a drop in response performance from the perspective of the host, are proposed. One or more storage devices which constitute a pool, and a controller which manages a log-structured write space which is a virtual logical space, compresses data of a compression target among the data which has been written to the virtual volume by the host and logs the data in the log-structured write space, and writes the post-compression data which has been logged in the log-structured write space to the storage device, are provided in a storage apparatus, the controller restricting reception of a write request from the host when a used capacity of the pool is at or above a threshold; when the data logged in the log-structured write space has been updated, the controller determines whether a predetermined condition is satisfied and, when the predetermined condition is satisfied, the controller overwrites the compressed data of the pre-update data which has been logged in the log-structured write space with the compressed data of the post-update data.

8 Claims, 19 Drawing Sheets

(52) U.S. Cl.
CPC .......... *G06F 3/0664* (2013.01); *G06F 3/0673* (2013.01); *G06F 12/0253* (2013.01)

(58) Field of Classification Search
USPC .......................................................... 710/68
See application file for complete search history.

(56) References Cited

U.S. PATENT DOCUMENTS

| | | |
|---|---|---|
| 2008/0288678 A1 | 11/2008 | Nakagawa et al. |
| 2011/0238914 A1 | 9/2011 | Hirayama |
| 2013/0007360 A1* | 1/2013 | Shiga .................... G06F 3/0608 |
| | | 711/112 |
| 2014/0189281 A1* | 7/2014 | Sokol, Jr. ................ G06F 12/08 |
| | | 711/171 |
| 2015/0012693 A1* | 1/2015 | Amit ....................... G06F 3/064 |
| | | 711/104 |
| 2015/0169450 A1 | 6/2015 | Traut et al. |
| 2015/0193170 A1* | 7/2015 | Sundaram ............. G06F 3/0641 |
| | | 711/103 |
| 2015/0309740 A1* | 10/2015 | Amit .................... G06F 12/0871 |
| | | 711/129 |
| 2018/0052614 A1* | 2/2018 | Sawa ..................... G06F 3/0608 |
| 2018/0088811 A1* | 3/2018 | Kanno ................... G06F 3/0604 |
| 2018/0095873 A1* | 4/2018 | Nakagoe ................. G06F 12/16 |
| 2018/0253253 A1* | 9/2018 | Sakamoto ............. G06F 3/0608 |
| 2018/0349063 A1 | 12/2018 | Matsushita et al. |
| 2019/0056878 A1* | 2/2019 | Nishizono ............. G06F 3/0632 |
| 2019/0095132 A1* | 3/2019 | Tatsumi .................... G06F 3/06 |

FOREIGN PATENT DOCUMENTS

| | | |
|---|---|---|
| JP | 2016-095829 A | 5/2016 |
| WO | 2016/203612 A1 | 12/2016 |
| WO | 2017/109931 A1 | 6/2017 |
| WO | 2017141315 A | 8/2017 |

* cited by examiner

FIG.4

PAGE MANAGEMENT TABLE 40

| PHYSICAL PAGE# | DEV# | Addr. | use | COMPRESSION FUNCTION EXISTENCE FLAG |
|---|---|---|---|---|
| 0 | 0 | 0 | 1 | 1 |
| 1 | 0 | 0x15000 | 1 | 1 |
| 2 | 0 | 0x2a000 | 1 | 1 |
| ... | ... | ... | ... | ... |
| n | 1 | 0 | 0 | 0 |
| ... | ... | ... | ... | ... |
| ... | ... | ... | ... | ... |

POOL MANAGEMENT TABLE 41

| POOL# | VIRTUAL VOLUME | LAST WRITE POSITION | POOL SIZE |
|---|---|---|---|
| 0 | 0, 1, 2,... | 0x0012,0x0023,0x0005,... | 0xFFFF |
| 1 | 1001, 1002,... | 0x0001,0x0001,... | 0x12AB |
| ... | ... | ... | ... |

VIRTUAL VOLUME MANAGEMENT TABLE 42

| VIRTUAL PAGE# | LAST UPDATE TIME | PAGE TYPE | PHYSICAL PAGE# | POOL# |
|---|---|---|---|---|
| 0 | 2015/1/1 10:00 | 1 | 0 | 0 |
| 1 | 2015/2/1 10:00 | 1 | 1 | 0 |
| 2 | 2015/3/1 10:00 | 0 | null | null |
| 3 | 2015/4/1 10:00 | 0 | null | null |
| ... | ... | ... | ... | ... |
| 42A | 42B | 42C | 42D | 42E |

PAGE TYPE:
0=LOG-STRUCTURED WRITE
1=OVERWRITE

FIG.7

LOG-STRUCTURED WRITE SPACE MAPPING TABLE 43

| LOG-STRUCTURED WRITE PAGE# | PHYSICAL PAGE# | POOL# | LAST WRITE POSITION ON PAGE |
|---|---|---|---|
| 0 | 3 | 0 | 0x14FFD |
| 1 | 4 | 0 | 0x14FF0 |
| 2 | 22 | 0 | 0x00005 |
| ... | ... | ... | ... |
| ... | ... | ... | ... |
| 43A | 43B | 43C | 43D |

FIG.8

LP CONVERSION TABLE 44

| LA | FPK UPPER 32 BITS | PA | Length | FPMQ REGISTRATION |
|---|---|---|---|---|
| 0x0000000000 | 0x11111111... | 0x1111111111 | 512 | 1 |
| 0x0000000001 | 0x22222222... | 0x2222222222 | 512 | 1 |
| 0x0000000002 | 0x33333333... | 0x3333333333 | 1536 | 0 |
| 0x0000000003 | 0x44444444... | 0x4444444444 | 2048 | 1 |
| 0x0000000004 | 0x55555555... | 0x5555555555 | 1024 | 1 |
| ... | ... | ... | ... | ... |
| 0xbbbbbbbb0 | 0x66666666... | 0x6666666666 | 1024 | 1 |
| 0xbbbbbbbb1 | 0x00000002... | 0x7777777777 | 512 | 1 |
| 0xbbbbbbbb2 | 0x77777777... | 0x8888888888 | 1536 | 1 |
| ... | ... | ... | ... | ... |
| 0xccccccccc1 | 0x88888888... | 0x9999999999 | 1024 | 0 |
| 0xccccccccc2 | 0x00000002... | 0x7777777777 | 512 | 1 |
| 0xccccccccc3 | 0x99999999... | 0xaaaaaaaaaa | 512 | 1 |
| ... | ... | ... | ... | ... |
| 0xddddddd1 | 0xaaaaaaaa... | null | ... | ... |
| ... | ... | ... | ... | ... |
| 44A | 44B | 44C | 44D | 44E |

FIG.10

GARBAGE MANAGEMENT TABLE 47

| PA | Length |
|---|---|
| 0x0010 | 512 |
| 0xFEBC | 256 |
| 0x1111 | 1024 |
| ... | ... |

LOG-STRUCTURED WRITE OVERWRITE CONDITION MANAGEMENT TABLE 48

| POOL# | TOTAL DATA AMOUNT | COMPRESSION/DEDUPLICATION TOTAL DATA AMOUNT | GARBAGE AMOUNT |
|---|---|---|---|
| 1 | 10240 | 5120 | 256 |
| 2 | 123456 | 9011 | 2563 |
| 3 | 200000 | 100010 | 12345 |
| ... | ... | ... | ... |

48A  48B  48C  48D

STORAGE APPARATUS AND METHOD OF CONTROLLING SAME

CROSS-REFERENCE TO PRIOR APPLICATION

This application relates to and claims the benefit of priority from Japanese Patent Application number 2018-11882, filed on Jan. 26, 2018 the entire disclosure of which is incorporated herein by reference.

BACKGROUND

The present invention generally relates to a storage apparatus and a method of controlling same, and, for instance, can be suitably applied to a storage apparatus equipped with a data compression/deduplication function.

Conventionally, storage apparatuses capable of saving large volumes of data at low cost have been in demand. In order to meet this demand, technology which performs lossless compression on data (hereinafter simply called compression) and records the data is known. By recording to a storage device after reducing the data size using compression, larger volumes of data can be stored in a storage apparatus than when the data is recorded to a storage device without being compressed. As a result, the costs of holding data such as the bit costs of a storage device and the power consumption costs of a storage apparatus can be reduced.

The post-compression data size of data is different depending on the data content and even when the data size of pre-compression data is the same, the data size of the post-compression data is not necessarily the same. For this reason, when data which has been compressed and recorded to a volume is updated, the pre-update data can sometimes not be overwritten with the post-update data.

Hence, PTL 1 discloses, when data which has been compressed and recorded to a volume is updated, writing the post-update compressed data to a volume separately from the pre-update data.

Note that, when post-update data is written to a volume separately from the pre-update data, the pre-update data remains in the volume and this data is unnecessary. For this reason, in a storage apparatus which is equipped with a compression function, processing known as garbage collection which discards this unnecessary data (hereinafter called garbage) is executed regularly.

Meanwhile, in a storage apparatus, deduplication technology exists as another technology for reducing the volume of data to be stored in a storage area of the apparatus. Deduplication technology includes a technology which, when a plurality of data of the same content exists in a storage apparatus, keeps only one of this plurality of data in a storage device in the storage apparatus and does not store the remaining data in the storage device.

Deduplication technology can also be used in conjunction with compression technology. For example, PTL 2 discloses a storage apparatus which performs deduplication processing on duplicate data among data that has been transferred from a host device and compresses data that has not been deduplicated.

As timing for performing compression/deduplication, there exist a control system (hereinafter called an inline system) which executes compression/deduplication processing of data synchronously with I/O (Input/Output) from a host device, and a control system (hereinafter called a post-process system) which executes compression/deduplication processing of data asynchronously to I/O from the host device.

An inline system executes compression/deduplication processing before sending an I/O response to the host device, and therefore reduces system performance (response performance and throughput performance) but is advantageous in that the result of data deletion resulting from compression/deduplication is obtained immediately and therefore the storage capacity to be prepared for the storage apparatus is simply the data amount after the compression/deduplication processing.

However, a post-process system executes compression/deduplication processing after sending an I/O response, and is therefore advantageous in that the system performance improves, but is disadvantageous in that a storage area for temporarily saving data that has not undergone compression/deduplication processing is required in addition to the storage area for saving the post-compression/deduplication data, and hence a proportionately larger storage area is required.

[PTL 1] International Publication No. 2017/141315
[PTL 2] Japanese Published Patent Specification No. 5216915

SUMMARY

Incidentally, in a storage apparatus which is equipped with a compression function, even when garbage collection is executed at regular intervals, when there is a rapid increase in data updates or when the data update frequency is high relative to the execution period of garbage collection processing, the garbage generation volume that is generated due to data updates is larger than the garbage discard volume that is generated due to garbage collection processing, and there is a risk of the pool becoming depleted due to the increase in garbage.

As a method for preventing this situation from arising, methods of restricting the reception of I/O from the host when the pool is almost depleted may be considered, but there is a problem in that, when such I/O reception restrictions are performed, the response performance of the storage apparatus is reduced from the perspective of the host.

The present invention has been devised in view of the foregoing points and an object of this invention is to propose a storage apparatus and a method of controlling same which, while preventing depletion of a storage area due to the generation of garbage, also prevent a drop in the response performance from the perspective of the host.

In order to achieve the foregoing object, the present invention is a storage apparatus which provides a virtual volume which is a virtual storage space to a host, comprising: one or more storage devices which constitute a pool, and a controller which manages a log-structured write space which is a virtual logical space, compresses data of a compression target among the data which has been written to the virtual volume by the host and logs the data in the log-structured write space, and writes the post-compression data which has been logged in the log-structured write space to the storage device, wherein, when a used capacity of the pool is at or above a threshold, the controller restricts reception of a write request from the host, and wherein, if a predetermined condition is satisfied when the data logged in the log-structured write space has been updated, the controller overwrites the compressed data of the pre-update data which has been logged in the log-structured write space with the compressed data of the post-update data.

Moreover, the present invention is a method of controlling a storage apparatus which provides a virtual volume which is a virtual storage space to a host, the storage apparatus comprising one or more storage devices which constitute a pool, and a controller which manages a log-structured write space which is a virtual logical space, compresses data of a compression target among the data which has been written to the virtual volume by the host and logs the data in the log-structured write space, and writes the post-compression data which has been logged in the log-structured write space to the storage device, the controller restricting reception of a write request from the host when a used capacity of the pool is at or above a threshold, the method comprising a first step in which, when the data logged in the log-structured write space has been updated, the controller determines whether a predetermined condition is satisfied, and a second step in which, when the predetermined condition is satisfied, the controller overwrites the compressed data of the pre-update data which has been logged in the log-structured write space with the compressed data of the post-update data.

According to this storage apparatus and method of controlling same, the generation of garbage due to data updates can be curbed and pool depletion due to an increase in garbage can be suppressed. Moreover, a situation where the reception of write requests from a host is restricted can be effectively suppressed.

According to the present invention, it is possible to realize a storage apparatus and a method of controlling same which, while preventing depletion of a storage area due to garbage generation, also prevent a drop in the response performance from the perspective of the host.

BRIEF DESCRIPTION OF DRAWINGS

FIG. 4 is a diagram showing a configuration example of a page management table.

FIG. 5 is a diagram showing a configuration example of a pool management table.

FIG. 6 is a diagram showing a configuration example of a virtual volume management table.

FIG. 7 is a diagram showing a configuration example of a log-structured write space mapping table.

FIG. 8 is a diagram showing a configuration example of an LP conversion table.

FIG. 10 is a diagram showing a configuration example of a garbage management table.

FIG. 11 is a diagram showing a configuration example of a log-structured write overwrite condition management table.

FIG. 12 is a block diagram serving to explain programs which are installed on the storage apparatus, and the like.

DESCRIPTION OF EMBODIMENTS

Figure 1:
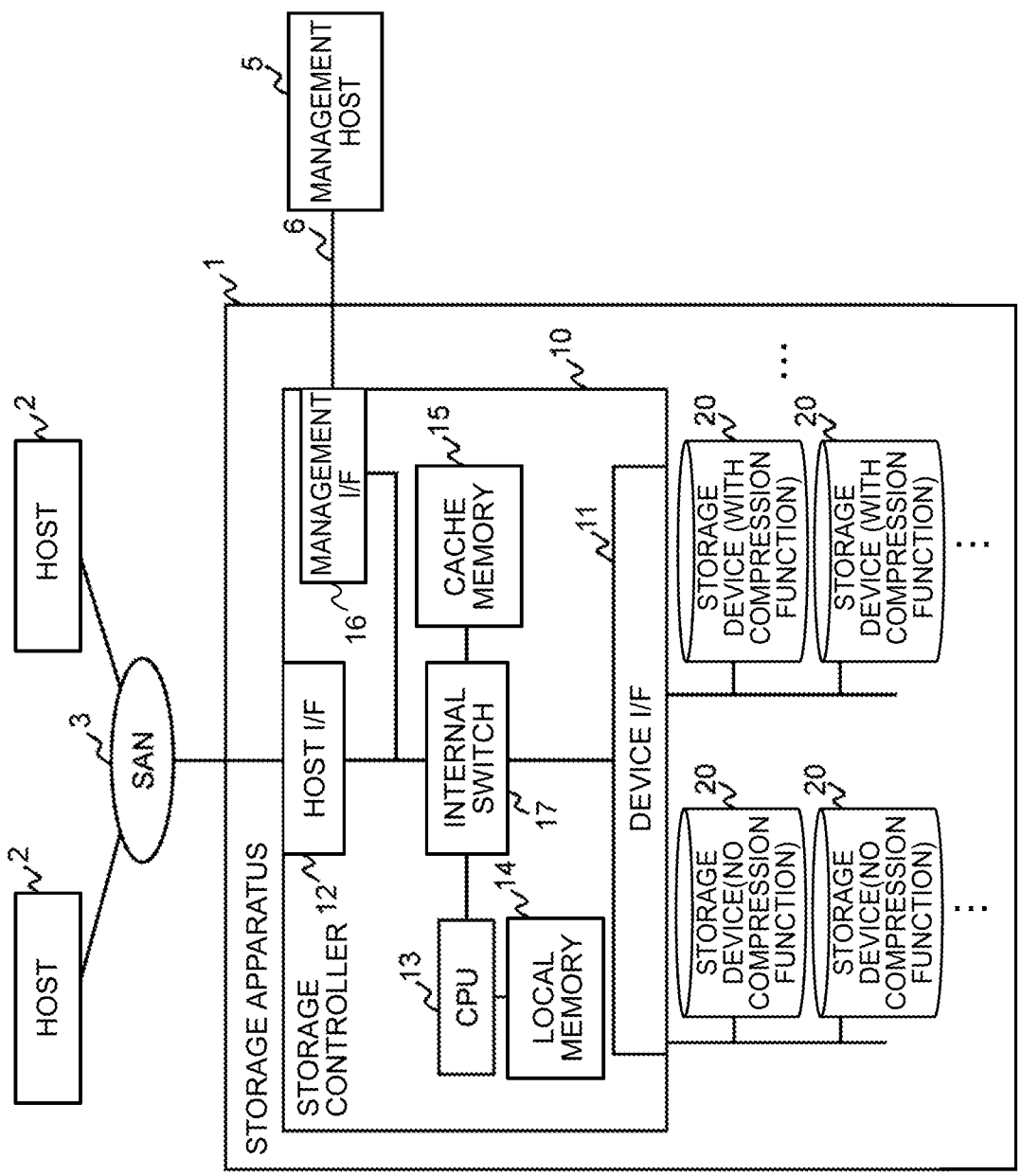
FIG. 1 is a block diagram showing a configuration example of a computer system which comprises the storage apparatus according to this embodiment.

An embodiment of the present invention will be explained in detail hereinbelow with reference to the drawings.

Note that, in the ensuing embodiment, the processing that is executed in the storage apparatus is sometimes explained with a 'program' as the subject of the processing. In reality, the processing described for the programs is executed as a result of a processor (CPU: Central Processing Unit), which the storage apparatus comprises, executing the programs, and therefore the subject of the processing is the processor (CPU). However, in order to prevent redundancy in the explanation, the content of the processing may be explained with the programs as the subject. Furthermore, all or a portion of the programs may be realized by dedicated hardware.

Moreover, various programs which will be explained hereinbelow may be provided by means of storage media that can be read by a program distribution server or computer and may be installed on each device which executes the programs. Storage media that can be read by a computer are nonvolatile storage media such as, for instance, IC (Integrated Circuit) cards, SD (Secure Digital) cards and DVDs (Digital Versatile Discs), which are non-temporary, computer-readable media.

Before beginning the explanation of this embodiment, various terms which are used in this specification will be explained.

In this specification, 'compression' means processing which reduces data size while retaining data meaning by using a lossless compression algorithm such as the LZW (Lempel-Ziv-Welch) algorithm. In the storage apparatus according to this embodiment, compression of data which has been written by a host is sometimes performed. Data which has been reduced in size as a result of compression processing being performed in the storage apparatus is called 'compressed data,' and data which has not undergone compression processing in the storage apparatus is called 'uncompressed data.' Moreover, processing to restore compressed data to its original data size by using a lossless compression algorithm is called 'expansion.'

A 'volume' signifies a storage space which a target device such as a storage apparatus or storage device provides to an initiator device such as a host computer. When an initiator device issues a data write request to write data to a certain position (address) in a storage space, data is stored in a storage area that has been assigned to that address. The storage apparatus according to this embodiment provides virtual volumes which are formed by means of so-called Thin Provisioning as volumes. The virtual volumes are configured such that, in an initial state (immediately after the virtual volume has been defined), a storage area has not been assigned to each address in the virtual volume. Upon receiving a data write request from an initiator device (host) to write data to an address in the storage space, the storage apparatus dynamically determines the storage area which is assigned to the address.

A 'block signifies an area on the volume. According to the embodiment which will be explained hereinbelow, a block is an area of a size equal to the smallest access unit when the initiator device accesses the volume and is of a fixed length. By way of an example, the size of a block is 512 bytes. When accessing an area on the volume, the initiator device accesses the area by designating addresses which have been assigned to each block. This address is called a logical block address (hereinafter called an LBA). The LBA of the head block of the volume is 0, and consecutive numbers 1, 2, and so forth are appended to the subsequent blocks in order. Furthermore, in the embodiment hereinbelow, addresses other than LBA are sometimes used as addresses specifying areas on a volume. Corresponding explanations will be provided in the course of the embodiment.

'Deduplication processing' denotes processing which, when a plurality of data of the same content exists in a storage apparatus, keeps only one of this plurality of data in the storage apparatus and deletes the remaining data from the storage apparatus. The act of determining whether data of the same content exists in the storage apparatus is called the 'deduplication determination,' and the processing thereof is called 'deduplication determination processing.' Note that, unless otherwise specified, deduplication processing includes deduplication determination processing.

The storage apparatus according to this embodiment which will be explained hereinbelow performs a deduplication determination for each data item of a predetermined size known as a chunk. In the embodiment hereinbelow, an example in which the size of a chunk is 8 KB is explained but the chunk size may be a size other than 8 KB. Data or chunks of the same content are called 'duplicate data (or duplicate chunks).'

In a deduplication determination, when two data items are compared in bit units or byte units, the determination processing takes a long time. For this reason, an apparatus which performs a deduplication determination on comparison target data usually generates chunk code which is a feature amount of a small size (around 8 bytes, for instance), calculated based on the data, of hash values or the like that are calculated by using a hash function, for example, and performs a deduplication determination by using this generated chunk code. In the embodiment hereinbelow, a chunk code which is generated from data is called a 'FingerPrint Key.' FingerPrint Key is sometimes abbreviated to 'FPK.'

In the embodiment explained hereinbelow, when an FPK value calculated from data A is H, the value H is known as the FPK of data A. Conversely, data A is known as 'data with the FPK H.'

The 'deduplication range' means the data search range when it is determined whether duplicate data exists. For example, when the deduplication range is 'storage apparatus,' when determining whether the same data as data A exists, the storage apparatus compares data A with all of the data in the storage apparatus. Meanwhile, when the deduplication range is limited to a portion of the storage devices in the storage apparatus (referred to here as a 'memory group'), upon determining whether duplicate data exists, the storage apparatus searches for the existence of duplicate data among only the data of the corresponding memory group.

'Updating' a storage area or data means that the content of data which is stored in the storage area is rewritten (overwritten) with new content. In the ensuing explanation, before a certain storage area or certain data is updated, the data which is stored in this storage area or the data before the update is known as 'pre-update data,' and the data which is newly written to the storage area or data after the update is known as 'updated data' or 'post-update data.'

'(Log-structured write)' or '(logging)' denotes an operation in which data is written sequentially to an unused area of the storage area. A log-structured write storage area is provided in the storage apparatus according to the embodiment hereinbelow. When the storage apparatus performs log-structured write processing, data is written in order starting at the head of the log-structured write storage area. The storage apparatus stores an end address to which data was written in the log-structured write processing that was just performed and, when performing log-structured write processing, data is written starting from the address following this end address.

(1) System Configuration

The storage apparatus according to this embodiment will be explained next. FIG. 1 shows a configuration example of a computer system which comprises the storage apparatus 1 according to this embodiment. This storage apparatus 1 comprises a storage controller 10 and a plurality of storage devices 20 which are connected to the storage controller 10.

The storage devices 20 are used to enable the storage apparatus 1 to store write data from a host device such as a host 2. As storage devices 20, HDD (Hard Disk Drives) which use magnetic disks as storage media, or SSD (Solid State Drives) which adopt nonvolatile semiconductor memory such as flash memory as storage media are used, for example.

As the storage devices 20, the storage apparatus 1 according to this embodiment is equipped with both a storage device which has a compression function (a compression-function storage device) 20 that compresses and stores data and expands and outputs stored data (that is, which performs data compression/expansion in the storage device 20) and also a storage device which does not have this compression function (a compression function-less storage device) 20.

The storage devices 20 are, by way of example, connected to the storage controller 10 by means of transmission lines (SAS links) which follow the SAS (Serial Attached SCSI) standard or transmission lines (PCI links) which follow the PCI (Peripheral Component Interconnect) standard, or the like.

One or more hosts 2 are connected to the storage controller 10. Further, a management host 5 is also connected to the storage controller 10. The storage controller 10 and host 2 are connected via a SAN (Storage Area Network) 3 which is formed by using a fiber channel, by way of example. The storage controller 10 and management host 5 are connected via a LAN (Local Area Network) 6 which is formed by using an Ethernet (registered tradename), by way of an example.

The storage controller 10 comprises at least a device interface (hereinafter called a device I/F) 11, a host interface (hereinafter called a host I/F) 12, a CPU 13, a local memory 14, a cache memory 15 and a management interface (hereinafter called a management I/F) 16. Furthermore, the device I/F 11, host I/F 12, CPU 13, cache memory 15, and management I/F 16 are mutually connected via an internal switch (hereinafter called an internal SW) 17. Although only one of each of these constituent elements is shown in FIG. 1, in order to attain high performance and high availability, a plurality of each of these constituent elements are built into the storage controller 10. Furthermore, a configuration in which the components are each mutually connected via a common bus instead of the internal SW17 is also possible.

The device I/F 11 comprises at least an interface controller and a transfer circuit. An interface controller is a component for converting the protocol that is used by the storage devices 20 (SAS as an example) to a communications protocol (PCI-Express, for example) which is used within the storage controller 10. A transfer circuit is used when the storage controller 10 transfers (reads and writes) data from/to the storage devices 20.

Like the device I/F 11, the host I/F 12 comprises at least an interface controller and a transfer circuit. The interface controller that the host I/F 12 comprises performs protocol conversion between the communications protocol (Fiber Channel, for example) which is used in the data transfer line between the host 2 and the storage controller 10, and the communications protocol which is used within the storage controller 10.

The CPU 13 is a processor which performs various control of the storage apparatus 1. Furthermore, programs which are executed by the CPU 13 are stored in the local memory 14. When performing data compression processing, the CPU 13 uses a portion of the storage areas in the local memory 14 as a kind of work area. Volatile storage media such as DRAM (Dynamic Random-Access Memory) or SRAM (Static Random-Access Memory) can be applied as the local memory 14, but nonvolatile memory may also be applied in a further embodiment.

The cache memory 15 is used to temporarily hold data that is input and output to/from the storage devices 20. Furthermore, the cache memory 15 is also used to store various management information of the storage apparatus 1, which is used by the CPU 13. Volatile storage media such as DRAM or SRAM can be applied as the cache memory 15, but the cache memory 15 may also be configured by using nonvolatile memory in a further embodiment. When volatile storage media are applied as the cache memory 15, the configuration may also be such that an auxiliary power source such as a battery is installed in the storage apparatus 1 to enable the stored content of the cache memory 15 to be preserved in the event of a power outage.

The management I/F 16 is hardware for executing protocol control when the storage controller 10 performs communications with the management host 5 and is connected to the management host 5 via a communication line 6 such as a communication cable.

In the storage apparatus 1 according to this embodiment, the CPU 13 is able to access both the local memory 14 and the cache memory 15. However, the CPU 13 performs access via the internal switch 17 when accessing the cache memory 15. Therefore, the response time when the CPU 13 accesses the cache memory 15 is longer than the response time when the CPU 13 accesses the local memory 14.

The management host 5 is a computer which enables the user (administrator) to perform the management operations of the storage apparatus 1. The management host 5 is configured from a notebook-type personal computer device and the like which comprises I/O devices (not shown) such as a keyboard and display. The user (administrator) is able to issue configuration instructions for the storage apparatus 1 by using the I/O devices. Moreover, the management host 5 is also able to display information such as the state of the storage apparatus 1 on an output device such as a display.

The storage apparatus 1 according to this embodiment is able to compress/expand data that is stored in the storage devices 20. Data compression/expansion is carried out as a result of the CPU 13 executing program code for performing data compression/expansion or is performed within the compression-function storage device 20. However, as a further embodiment, the configuration may be such that the storage controller 10 comprises dedicated hardware for performing data compression/expansion and the storage controller 10 performs data compression/expansion by using this hardware.

(2) Storage Area Management

The storage areas that are managed by the storage apparatus 1 according to this embodiment will be explained next. One or more storage devices 20 which the storage apparatus 1 according to this embodiment comprises provide storage spaces of a predetermined size to the storage controller 10. However, the storage controller 10 does not directly provide the storage spaces provided by the storage devices 20 to the host 2. The storage controller 10 provides one or more virtual storage spaces which differ from the storage spaces provide by the storage devices 20 to the host 2. This virtual storage space is called a 'virtual volume.' Furthermore, the virtual volume (the storage space provided to the host 2) is also referred to as the 'overwrite space.'

The virtual volume is a volume that is formed by using well-known Thin Provisioning. Upon receiving a write request from the host 2 to write to an area in the virtual volume, the storage apparatus 1 assigns (maps) a storage area of the storage device 20 to this area.

In this embodiment, among the plurality of storage devices 20 that the storage apparatus 1 comprises, a storage device 20 which can be assigned to the virtual volume is made to belong to a management unit known as a 'pool.' The storage apparatus 1 manages the storage space of the storage device 20 which belongs to the pool by partitioning the storage area into partial areas of a predetermined size (42 MB by way of example). In this embodiment, these partial areas are called 'physical pages' or 'pages.' Note that a plurality of pools may be provided in the storage apparatus 1. A unique identification number in the storage apparatus 1 which is known as a pool number (pool#) is assigned to each pool. Moreover, a pool with a pool number k is shown as pool#k.

In assigning storage area of the storage device 20 to a virtual volume, the storage apparatus 1 assigns the storage area in physical page units. Therefore, the storage apparatus 1 also manages the virtual volume by partitioning the virtual volume into areas of the same size as the physical pages. In the ensuing explanation, areas in the virtual volume which are of the same size as physical pages are also called 'virtual pages' or 'overwrite pages.' Note that, in this embodiment, an example in which the size of a virtual page is 42 MB is explained but the virtual page size could be another size.

When accessing the virtual volume, the host 2 issues an access request (read request, write request, and the like) to the storage apparatus 1. A read request or write request includes an identifier (a LUN (Logical Unit Number) or the like) for specifying a virtual volume which is the access target, and information for specifying an area in the virtual volume. The information for specifying an area in the virtual volume includes an LBA and area length information.

Upon receiving a write request from the host 2, the storage apparatus 1 specifies the access-target virtual page from information (LBA and area length), specifying an area in the virtual volume, which is included in the write request. When a physical page has not yet been assigned to the access-target virtual page, the storage apparatus 1 selects an unused physical page from among the physical pages that exist in the pool to which the virtual volume belongs (a physical page which has not yet been assigned to a virtual page), and assigns (maps) the selected physical page to the data write destination virtual page. The write data from the host 2 is stored in the physical page which has been mapped to this data write destination virtual page.

Moreover, the storage apparatus 1 manages correspondence (mapping) between the virtual pages and physical pages which have been assigned to the virtual pages by storing this correspondence in a mapping table (a virtual volume management table 42, described hereinbelow with reference to FIG. 6, or the like). Furthermore, upon receiving a read request to read a virtual page, the storage apparatus 1 specifies the physical page assigned to the virtual page by referring to the mapping table and reads data from the specified physical page.

Figure 2:
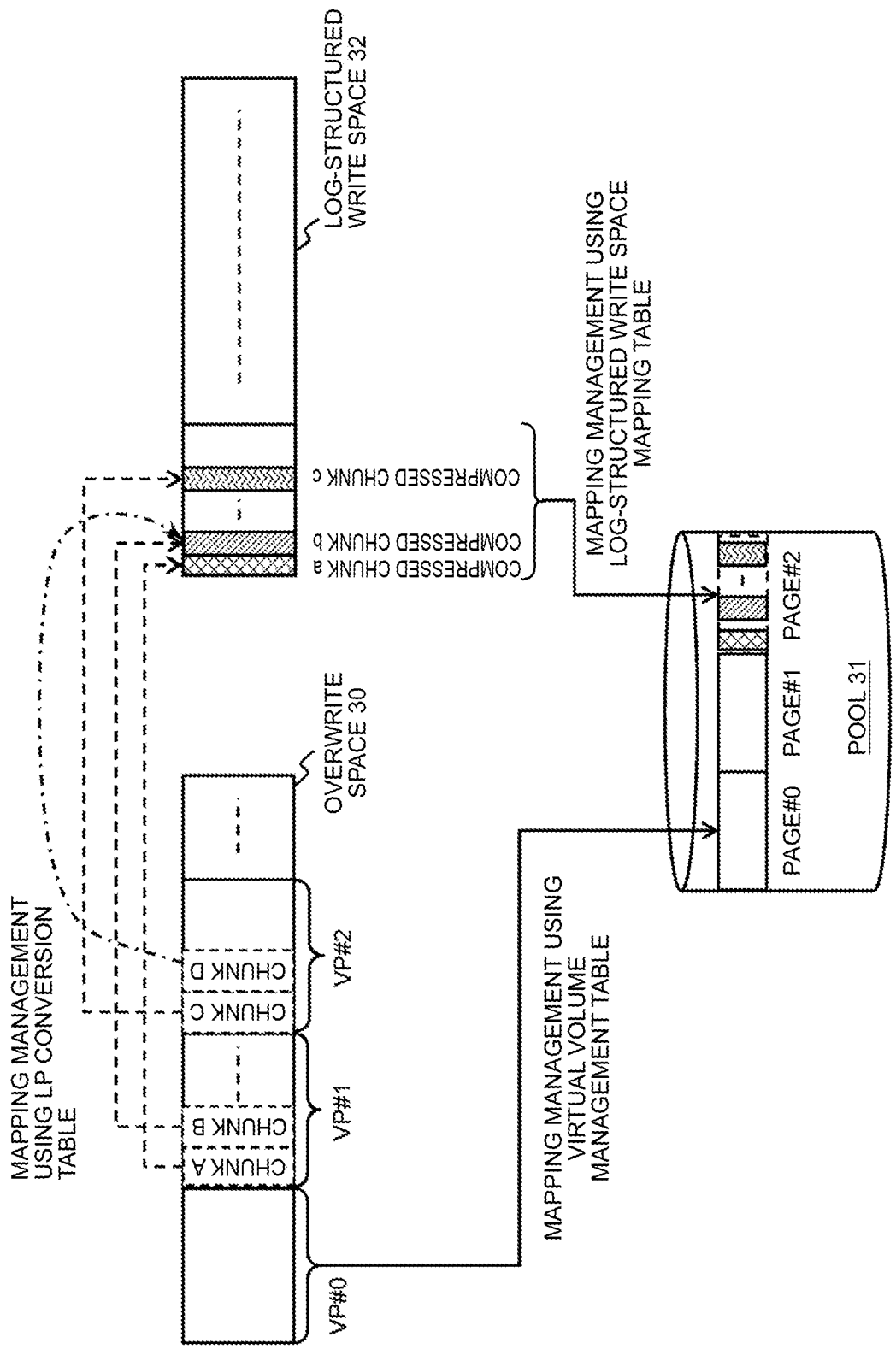
FIG. 2 is a conceptual drawing showing the relationship between virtual volumes and pages.

FIG. 2 shows the relationships between virtual volumes and storage areas (physical pages) which have been assigned to the virtual volumes. In FIG. 2, a rectangular object 30 represents a virtual volume (overwrite space) and a cylindrical object 31 denotes a pool.

The storage apparatus 1 comprises a different storage space in addition to the virtual volumes (overwrite spaces). This storage space is called a 'log-structured write space.' The rectangular object 32 shown in FIG. 2 represents the log-structured write space. The log-structured write space is not a storage space that can be accessed by the host 2, rather, this is a storage space which can only be used by the storage controller 10. The log-structured write space is used by the CPU 13 of the storage controller 10 to store compressed data in the storage devices 20 by means of log-structured writing.

The relationships between the virtual pages of the overwrite space and the physical pages will be explained first. A unique identification number (non-negative integer values are used for the identification numbers), known as a virtual page number (sometimes also written as VP#) is assigned to each virtual page. In FIG. 2, a virtual page with a virtual page number n (n is a non-negative integer value) is written as 'VP#n.' Similarly, a unique identification number (the identification numbers are also non-negative integer values), known as a physical page number, is assigned in the storage apparatus 1 to each physical page. In FIG. 2, a physical page with a physical page number n (n is a non-negative integer value) is written as 'physical page #n.' In the example of FIG. 2, an example where a 'physical page #0' is mapped to 'VP#0' is shown.

Upon receiving a write request (and write data) from the host 2, which targets an area in a virtual page (one or more blocks), the storage apparatus 1 stores the write data in blocks in the physical page which has been mapped to the virtual page. Moreover, the storage apparatus 1 manages correspondence (mapping) between the virtual page and physical page at this time by storing this correspondence in the virtual volume management table 42, described hereinbelow with reference to FIG. 6.

Upon receiving a data write request to write from the head to an nth block of the virtual page, the storage apparatus 1 according to this embodiment essentially (except for a compressed data storage case described hereinbelow) stores the data from the head to the nth block of the physical page which has been mapped to the virtual page. Note that in order to avoid redundancy in the ensuing explanation, the fact that the storage apparatus 1 stores data in a physical page which has been assigned to the virtual page will be expressed as 'stores data in a virtual page (or overwrite space).'

Like an overwrite space, a log-structured write space is a storage space that is formed by means of the so-called Thin Provisioning technology. The storage controller 10 dynamically assigns a physical page to an area in the log-structured write space and writes the data to physical pages which have been assigned to the log-structured write space. In the same way as for an overwrite space, the storage apparatus 1 manages the log-structured write space by partitioning the log-structured write space into areas of the same size as the physical page. Such an area is called a 'log-structured write page.' A unique identification number, which is known as a log-structured write page number is also assigned to the log-structured write page.

Moreover, the storage apparatus 1 manages correspondence (mapping) between the log-structured write page and physical page by storing this correspondence in a log-structured write space mapping table 43 (FIG. 7) described hereinbelow. Note that in order to avoid redundancy in the ensuing explanation, processing in which the storage apparatus 1 writes data to a physical page which has been assigned to the log-structured write page will be expressed as 'writes data to a log-structured write page (or log-structured write space).'

As was also described earlier, data that is written to the log-structured write space is compressed data. Moreover, the log-structured write space is provided for each virtual volume. Accordingly, when there exist n virtual volumes, there are also n log-structured write spaces. A physical page which is assigned to a log-structured write space is the same as a physical page which is assigned to a virtual page, and an unused physical page is selected from the pool. When chunks of a virtual volume, to which a physical page that exists in a pool with a pool number k has been assigned, are migrated to a log-structured write space, the physical page assigned to the log-structured write space is a physical page that exists in the pool with the pool number k.

The storage apparatus 1 performs compression processing as required on data (uncompressed data) that has been written from the host 2 to a virtual page. The compressed data generated through compression processing is migrated to a place that is different from the physical page where the uncompressed data is stored, more specifically, is migrated to a log-structured write space. A determination of whether duplicate data exists, or the like, is also performed.

The storage apparatus 1 according to this embodiment divides the area in the virtual page into 8 KB partial areas in order starting at the head of the virtual page and performs data compression for each partial area. In this embodiment, these 8 KB partial areas (or the data that is stored in these partial areas) are called 'chunks.' Note that a size other than 8 KB may also be adopted for the chunk size. Moreover, data which is generated by compressing chunks, or data that satisfies the premise of being written to a compression device and skips compression processing is referred to as a 'compressed chunk.' The size of a compressed chunk varies depending on the content of the data but is a minimum of 512 bytes and a maximum of 8 KB. Further, the storage apparatus 1 according to this embodiment generates compressed chunks of a size which are an integer multiple of 512 bytes.

When (the CPU 13 of) the storage controller 10 generates compressed chunks, the storage controller 10 logs these compressed chunks in the log-structured write space. When the chunks of a certain virtual page have all been compressed and the compressed chunks have been completely written to the log-structured write space, the physical page assigned to the virtual page is discarded. Specifically, the physical page which has been assigned to the virtual page is changed to an unused state (a state of not being assigned to a virtual page). As a result, the data which was written to the overwrite space has been migrated to the log-structured write space.

Note that chunks (compressed chunks) of a plurality of virtual pages are sometimes stored in a physical page which has been assigned to the log-structured write space. This is because the size of the chunks is small as a result of compression and it may then also be possible for the data of a plurality of virtual pages to be accommodated in a single physical page. The storage apparatus 1 manages correspondence (mapping) between the chunks in the overwrite space and the compressed chunks in the log-structured write space by storing this correspondence in an LP conversion table 44 described hereinbelow with reference to FIG. 8.

When there has been an update data write request (that is, an update request) from the host 2 to write to a virtual page for which the data written from the host 2 has been migrated to the log-structured write space, the update data is compressed and essentially stored in the log-structured write space by means of logging. However, as a further embodiment, the configuration may be such that the storage apparatus 1 reassigns the physical page to a virtual page of the overwrite space, expands the data which has been migrated to the log-structured write space, writes the expanded data back to the physical page thus assigned to the virtual page, and updates (overwrites) the data in the physical page.

An address which is used by the storage apparatus 1 to specify a chunk in the overwrite space is called an LA. An LA is an address that is assigned to each chunk and is given by the following equation.

[Equation 1]

$$LA = LBA \div 16 \quad (1)$$

The LA of the chunk located at the head of the overwrite space is 0, and consecutive numbers 1, 2, and so forth are assigned to subsequent consecutive chunks in that order.

Meanwhile, the compressed chunks in the log-structured write space are of variable length and a minimum of 512 bytes in size, and hence an address is assigned to each 512-byte area (block) in the overwrite space. This address is known as a PA. The PA of a 512-byte area which is located at the head of the log-structured write space is 0, and consecutive numbers 1, 2, and so forth are used for the PA of subsequent consecutive areas in that order.

(3) Management Information

The content of management information which is used to manage the pool (object 31 in FIG. 2), virtual volume (object 30 in FIG. 2), and log-structured write space (object 32 in FIG. 2), which were described hereinabove, will be explained next. Note that a leading character string "0x" has been added to numerical values in the present specification and drawings, and this means that the numerical value has been written using hexadecimal notation.

Figure 3:
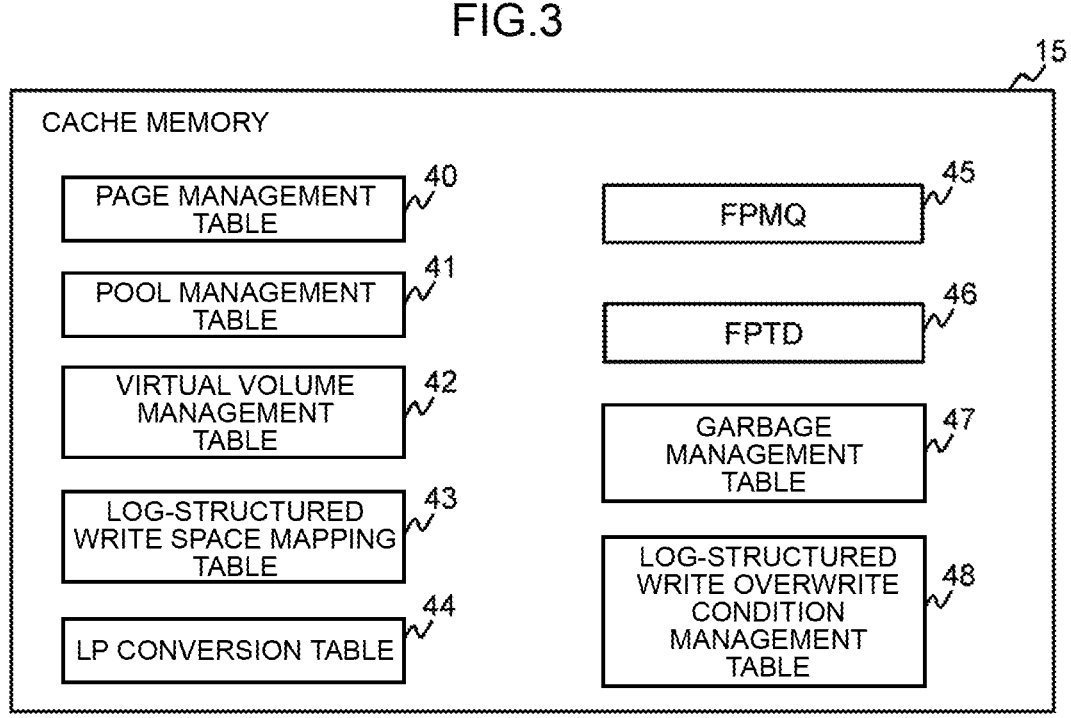
FIG. 3 is a block diagram showing a list of management information.

FIG. 3 shows management information of the storage apparatus 1. The storage apparatus 1 holds a page management table 40, a pool management table 41, a virtual volume management table 42, a log-structured write space mapping table 43, a logical/physical page conversion table (LP conversion table) 44, an FPMQ (FingerPrint Match Queue) 45, an FPTD (FingerPrint Table Directory) 46, a garbage management table 47, and a log-structured write overwrite condition management table 48, in the cache memory 15.

FIG. 4 shows a configuration example of the page management table 40. The page management table 40 is a table that is used to manage the physical pages which belong to pools and is provided for each pool. Therefore, when n pools are provided in the storage apparatus 1, the storage apparatus 1 comprises n page management tables 40.

Information on each physical page in a corresponding pool is stored in each row (record) of the page management table 40. Each record comprises a physical page number (page#) field 40A, a DEV number (DEV#) field 40B, an address field 40C, a use field 40D, and a compression function existence flag field 40E.

Further, the physical page number field 40A stores the physical page numbers of all of the corresponding physical pages that exist in the corresponding pool. That is, a record with a physical page number 'n' that is stored in the physical page number field 40A is a record for managing information relating to the physical page with the physical page number 'n' in the corresponding pool.

Furthermore, the DEV number field 40B stores the identification number (device number) of the storage device 20 where the corresponding physical page exists, and the address field 40C stores the address where the physical page in the storage device 20 exists. Accordingly, in the case of FIG. 4, it can be seen that the physical page with the physical page number '1' corresponds to a 42 MB area (an area equal to the size of one physical page) starting from address '0x15000' of the storage device 20 with the device number '0.'

The use field 40D stores information indicating the usage state of the corresponding physical page. When the corresponding physical page has been mapped to a virtual volume or to the log-structured write space, '1' is stored in the use field 40D. Conversely, when the corresponding physical page has not been mapped to a virtual volume or to the log-structured write space, '0' is stored in the use field 40D. A physical page for which '1' has been stored in the use field 40D is called an in-use page, whereas a physical page for which '0' has been stored in the use field 40D is called an unused page.

The compression function existence flag field 40E stores information (a compression function existence flag) which indicates whether the storage device 20 in which the corresponding physical page exists has a compression function. When the storage device 20 comprises a compression function, the compression function existence flag is configured to '1,' and when the storage device 20 does not comprise a compression function, the compression function existence flag is configured to '0.'

Note that, in this embodiment, an example is explained where the identification number and address of the storage device 20 (HDD, for example) are registered in the page management table 40 and where each physical page corresponds to the storage area in one storage device 20. However, a configuration method other than a pool (or physical page) configuration method may be adopted. For example, when, in storage apparatus 1, one logical storage device (hereinafter called a logical device) is formed from a plurality of storage devices 20 by using RAID (Redundant Arrays of Independent (or Inexpensive) Disks) technology, a storage area of a predetermined size (42 MB, for example) in the logical device may be adopted as a page. In this case, the DEV number field 40B and address field 40C of the page management table 40 stores the identification number of the logical device and the address in the logical device.

FIG. 5 shows a configuration example of the pool management table 41. The pool management table 41 is a table that is used to store information relating to the virtual volumes which belong to each pool, and the like. When a plurality of pools exist, the storage apparatus 1 causes each virtual volume to belong to any one pool. Upon assigning a physical page to a virtual page of a virtual volume, the storage apparatus 1 selects an unused physical page in the pool to which the virtual volume belongs and assigns the selected physical page to the virtual page.

Each record in the pool management table 41 comprises a pool number field 41A, a virtual volume number field 41B, a last write position field 41C, and a pool size field 41D. Furthermore, the pool number field 41A stores a pool number. Furthermore, the virtual volume number field 41B stores an identification number of the virtual volume (virtual volume number) which belongs to the pool. When a plurality of virtual volumes that belong to the pool exist, a plurality of virtual volume numbers are stored in the virtual volume number field 41B.

The last write position field 41C stores the log-structured write page number of the log-structured write page to which a compressed chunk was last written in the log-structured write space and which log-structured write page is associated with the virtual volume, in association with each virtual volume which belongs to the corresponding pool (each virtual volume for which a virtual volume number has been stored in the virtual volume number field 41B of the same row). When writing the compressed chunk to the log-structured write page, the storage controller 10 specifies the log-structured write page for which writing was last performed by referring to the last write position field 41C.

Furthermore, the pool size field 41D stores the pool size (capacity) of the corresponding pool. In the example of FIG. 5, it can be seen that the pool size (capacity) of the pool to which the pool number '0' has been assigned is '0xFFFF,' and that the pool size (capacity) of the pool to which the pool number '1' has been assigned is '0x12AB.'

FIG. 6 shows a configuration example of the virtual volume management table 42. The virtual volume management table 42 is created for each virtual volume. Therefore, exist a plurality of virtual volumes exist, there are also a plurality of virtual volume management tables 42. The virtual volume management table 42 is also stored and managed in the cache memory 15.

Information on each virtual page in a corresponding virtual volume is stored in each record of the virtual volume management table 42. Specifically, each record comprises a virtual page number (virtual page#) field 42A, a last update time field 42B, a page type field 42C, a physical page number (physical page#) field 42D, and a pool number (pool#) field 42E.

Further, the virtual page number field 42A stores the virtual page numbers of the virtual pages. Further, the physical page number field 42D stores the physical page numbers of the physical pages which have been assigned to the corresponding virtual pages. The pool number field 42E stores the pool numbers of the pools in which the physical pages, which have been assigned to the corresponding virtual pages, exist.

The last update time field 42B stores the time when a write request to write to the corresponding virtual page was last received. Each time a write request to write to a certain virtual page is received, the storage apparatus 1 stores the time when the write request was received in the last update time field 42B of the virtual page.

The page type field 42C stores '1' or '0.' In an initial state, the values in the page type field 42C of all the virtual pages are configured to '1.'

When '0' is stored in the page type field 42C, this indicates that the data written to the corresponding virtual page has been compressed and migrated to the log-structured write space. In this case, an invalid value (called 'null;' specifically, a value that has not been used for a page number or pool number such as '−1') is stored in the physical page number field 42D and pool number field 42E. Furthermore, the storage location of data (the compressed chunk) that has been migrated is recorded in the LP conversion table 44 (FIG. 8) which will be described subsequently, or the like.

Meanwhile, when '1' is stored in the page type field 42C, this indicates that the data written to the corresponding virtual page has not yet been migrated to the log-structured write space or that a write request from the host 2 to write to the virtual page has not yet been generated. When the value of the page type field 42C is '1' and a valid value (a value other than 'null') has been stored in the physical page number field 42D and pool number field 42E, this indicates that a physical page has been assigned to the virtual page and that write data from the host 2 has been stored in the physical page. Conversely, when the value of the page type field 42C is '1' and 'null' has been stored in both the physical page number field 42D and the pool number field 42E, this indicates that a write request from the host 2 to write to the virtual page has not been generated and the physical page has not been assigned.

Note that when a plurality of virtual volumes exist, each record in the virtual volume management table 42 may include, in addition to information such as the virtual page number 42A as explained above, information for specifying the virtual volume (the virtual volume number, for example).

FIG. 7 shows a configuration example of the log-structured write space mapping table 43. The log-structured write space mapping table 43 stores management information for managing the physical pages which have been mapped to the log-structured write space. Because the log-structured write space is provided for each virtual volume, the log-structured write space mapping table 43 also exists for each virtual volume.

The log-structured write page number field 43A of each record stores the log-structured write page numbers (log-structured write page#) in ascending order. It can be seen that, in each record of the log-structured write space mapping table 43, a physical page, which is specified by the physical page number stored in the physical page number field 43B and a pool number stored in the pool number field 43C, has been assigned to a log-structured write page which is specified by the log-structured write page number stored in the log-structured write page number field 43A. When a physical page has not been assigned to the log-structured write page, 'null' is stored in the physical page number field 43B and pool number field 43C of the log-structured write page.

The on-page last write position field 43D stores a relative address of the block to which a compressed chunk was last written among the blocks in the log-structured write page. The relative address is, more specifically, the address of the block when the address of the head block in the page is established as '0.' In the example of FIG. 7, it can be seen that '0x00005' is stored in the on-page last write position field 43D of the record with the log-structured write page number '2' that is stored in the log-structured write page number field 43A, and hence a compressed chunk has been written to the physical page which has been assigned to the log-structured write page with the log-structured write page number '2,' from the head of this physical page to the fifth block thereof. When logging the compressed chunk to the log-structured write space, the storage apparatus 1 specifies the address stored in the on-page last write position field 43D and the position where the compressed chunk is to be written by referring to the address stored in the last write position field 41C of the pool management table 41.

The LP conversion table 44 will be explained next. The LP conversion table 44 is a table for managing the migration destination of each chunk when chunks in the overwrite space are compressed and migrated to the log-structured write space. FIG. 8 is a configuration example of the LP conversion table 44.

Each record in the LP conversion table 44 shows information on chunks in virtual volumes and correspondence (mapping) between the chunks and compressed-chunk recording positions. More specifically, in each record, the data of an 8 KB area (chunk) which is specified by the LA, stored in an LA field 44A of the record, in the overwrite space is compressed and stored in an area which is of a length stored in a length field 44D and which starts from an address specified by the PA stored in a PA field 44C in the corresponding log-structured write space, and the higher-order 32 bits of the FPK of this data are values which are stored in an FPK higher-order 32 bits field 44B.

As described earlier, the storage apparatus 1 according to this embodiment performs deduplication processing and, in essence, is therefore controlled so that a plurality of chunks of the same content are not stored in the log-structured write space. Once again, an overview of deduplication processing will be explained by using FIG. 2.

In FIG. 2, a case is assumed where, when two chunks, namely, a chunk 'A' and a chunk 'B' which are stored in a virtual page to which the virtual page number '1' has been assigned are each in a state of being stored in a log-structured write space as 'compressed chunk a' and 'compressed chunk b' respectively, the storage apparatus 1 starts processing to migrate the chunks, which are stored in the virtual page to which the virtual page number '2' has been assigned, to the log-structured write space. If the content of a 'chunk D' is the same as 'chunk B,' the compressed chunk 'chunk D' is written to the log-structured write space. Alternatively, the storage apparatus 1 stores a value, which is the same as the address stored in the PA field 44C of the record storing the information on 'chunk B' in the LP conversion table 44, in the PA field 44C of the record storing the information on 'chunk D' of the LP conversion table 44.

Furthermore, when performing the deduplication processing, the storage apparatus 1 calculates the chunk code of the values corresponding to the data of this chunk, for each chunk. As described hereinabove, in this embodiment, this chunk code is called an FPK (FingerPrint Key). In the case of this embodiment, an FPK is information eight bytes in size. However, an FPK may have a size other than eight bytes.

Figure 9:
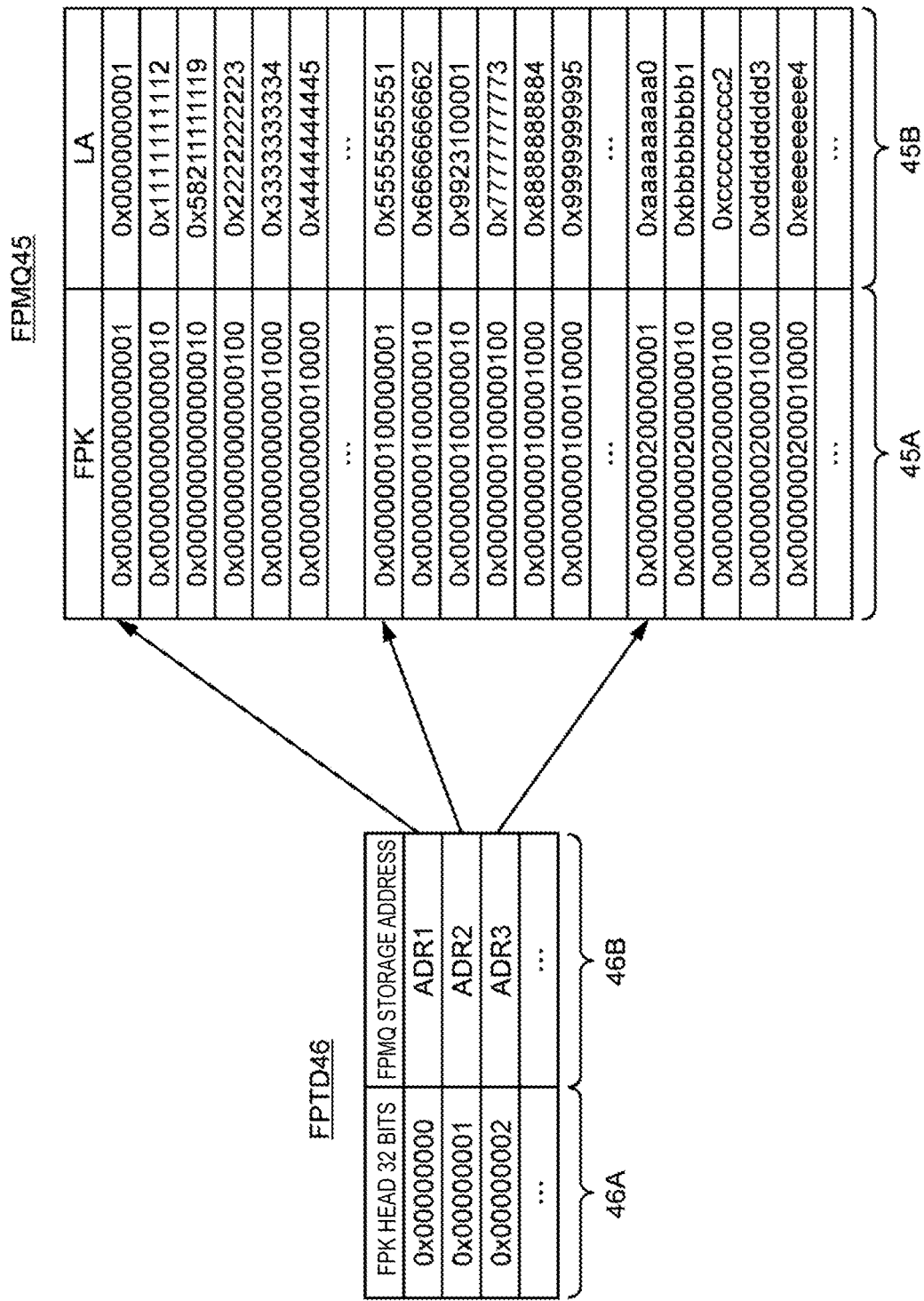
FIG. 9 is a diagram showing a configuration example of an FPMQ an FPTD.

The storage apparatus 1 records the correspondence between the FPK which is generated from the chunk and the LA of the chunk as management information. This management information is called an FPMQ (FingerPrint Match Queue). FIG. 9 shows a configuration example of the FPMQ 45. The FPMQ 45 is a table comprising an FPK field 45A and an LA field 45B, and an FPK which is generated from an 8 KB area (chunk) starting from the LA stored in the LA field 45B is stored in the FPK field 45A of the same record. The FPK of all the LA in the corresponding virtual volume are recorded in the FPMQ 45. The records of the FPMQ 45 are each sorted in the ascending order of the FPK stored in the FPK field 45A and the LA of the same FPK are sorted in the ascending order of the LA. In the ensuing explanation, a record in the FPMQ 45, that is, a set of the FPK field 45A and LA field 45B is sometimes called 'chunk metadata' (or simply 'metadata').

The FPMQ 45 is provided for each virtual volume. When migrating a chunk which is stored in the virtual volume with the virtual volume number 'n' (overwrite space) to the log-structured write space (this chunk will provisionally be called 'chunk A'), for example, the storage apparatus 1 determines whether a chunk (compressed chunk) which is the same as 'chunk A' already exists in the log-structured write space by referring to the FPMQ 45 used for virtual volume number 'n.'

When the same FPK as the FPK of 'chunk A' does not exist in the FPMQ 45 used for virtual volume number 'n,' the storage apparatus 1 is able to determine that a chunk (compressed chunk) which is the same as 'chunk A' does not exist in the log-structured write space used for pool number 'n.' In the storage apparatus 1 according to this embodiment, the range for deduplication is a virtual volume. Therefore, when a chunk (compressed chunk) which is the same as 'chunk A' does not exist in the virtual volume with the virtual volume number 'n' but exists in another virtual volume, 'chunk A' (compressed chunk) is written to the virtual volume with the virtual volume number 'n.'

Furthermore, in order to be able to perform a search for information in FPMQ 45 efficiently, the storage apparatus 1 has management information in which the addresses (addresses in the cache memory 15) where several records in the FPMQ 45 are stored is recorded. This management information is called a FingerPrint Table Directory. This management information will be called 'FPTD' hereinbelow.

FIG. 9 shows an example of the PFTD 46. The PFTD 46 is also provided for each virtual volume like the FPMQ 45. The FPMQ storage address field 46B stores, among the FPMQ 45 records, an address (an address in the cache memory 15) where the record with the smallest FPK stored in the FPK field 45A is stored, among the records for which the higher-order 32 bits of the FPK stored in the FPK field 45A are equal to the FBK head 32 bits stored in the FPK head 32 bits field 46A.

For example, a case is assumed where, among those records in the FPMQ 45 for which the higher order 32 bits stored in the FPK field 45A are '0x00000001,' the FPK stored in the FPK field 45A of the smallest-value record is 0x0000000100000001.' Here, when the address where the record with the FPK '0x0000000100000001' stored in the FPK field 45A is stored is 'ADR2,' the record in which the FPK head 32 bits stored in the FPK head 32 bits field 46A is '0x00000001' and the FPMQ storage address stored in the FPMQ storage address field 46B is 'ADR2' is recorded in the FPTD 46.

A compression/deduplication program 52 (FIG. 12), described hereinbelow, determines whether a value which is the same as the FPK is stored in the FPK field 45A of the FPMQ 45 after calculating the FPK of the chunk. The FPTD 46 is used because searches take time when the number of records stored in the FPMQ 45 is unusually high.

For example, when a record storing '0x0000000100000001' is searched, the compression/deduplication program 52 confirms that the value stored in the FPMQ storage address field 46B for which the value stored in the FPK head 32 bits field 46A is '0x00000001' is 'ADR2' by referring to the FPTD 46. Thereafter, the compression/deduplication program 52 seeks the record storing '0x0000000100000001' among the records in the FPMQ 45, starting with the record with the address 'ADR2' (this is the address in the cache memory 15). Note that the FPTD 46 is information for improving the speed of searching for information in the FPMQ 45, and therefore the FPTD 46 is not essential information.

The FPK higher order 32 bits field 44B in FIG. 8 will now be explained with reference to the FPMQ registration field 44E. The higher-order 32 bits of the FPK of the chunk are stored in the FPK higher order 32 bits field 44B of the LP conversion table 44. The FPMQ registration field 44E stores information which indicates whether metadata of the chunk has not been registered in the FPMQ 45. When metadata of the chunk specified by the LA stored in the LA field 44A has been registered in the FPMQ 45, the storage apparatus 1 stores '1' in the FPMQ registration field 44E, and when no such metadata has been registered, stores '0' in the FPMQ registration field 44E. Moreover, the FPK and the LA of the chunk are sometimes deleted from the FPMQ 45 after the FPK generated from the chunk (and the LA of the chunk) has been registered in the FPMQ 45. The storage apparatus 1 also stores '0' in the FPMQ registration field 44E in this case.

FIG. 10 shows a configuration example of the garbage management table 47. When data of the overwrite space has been compressed and migrated to the log-structured write space or pool and is subsequently updated, the pre-update compressed data (compressed chunk) that is present in the log-structured write space or pool is then garbage. The garbage management table 47 is a table that is used to manage such garbage that is present in the storage apparatus 1. This garbage management table 47 is generated for each log-structured write space (that is, for each pool).

The garbage management table 47 stores information for managing garbage that is present in the pool that is associated with the corresponding log-structured write space. More specifically, data which is stored in an area of the length stored in the length field 47B which starts from the address specified by the PA stored in the PA field 47A in the pool associated with the corresponding log-structured write space constitutes garbage. For example, in the example of FIG. 10, it can be seen that data which is stored in a '512' byte area whose PA starts from '0x0010' in the pool associated with the corresponding log-structured write space is garbage.

Furthermore, FIG. 11 shows a configuration example of the log-structured write overwrite condition management table 48. As will be described subsequently, the storage apparatus 1 according to this embodiment is equipped with a compressed chunk overwrite function which, when data for which a compressed chunk has already been stored in the log-structured write space has been updated, overwrites the compressed chunk of the pre-update data that has been stored in the log-structured write space with the compressed chunk of the post-update data, when a predetermined condition is satisfied. The log-structured write overwrite condition management table 48 is a table which is used to manage a garbage amount of each pool, and the like, and which is required to realize the compressed chunk overwrite function of this embodiment.

Each record in the log-structured write overwrite condition management table 48 comprises a pool number (pool#) field 48A, a total data amount field 48B, a compression/deduplication total data amount field 48C, and a garbage amount field 48D. Further, the pool number field 48A stores the pool number of each pool that exists in the storage apparatus 1 Furthermore, the total data amount field 48B stores the total value of the data sizes before compression/deduplication of the data of all areas used by the host. In the ensuing explanation, this total value will be suitably referred to as the 'total data amount' of the pool.

The compression/deduplication total data amount field 48C stores the total data amount of the compressed data that is obtained by the compression/deduplication processing, among the data which is stored in the corresponding pool. Further, the garbage amount field 48D stores the total data amount of the garbage that exists in the corresponding pool. Therefore, in the case of the example of FIG. 11, it can be seen that the pool with the pool number '1' stores data equivalent to a total data amount of '10240' (GB) whose data amount has been reduced to '5120' (GB) by means of compression/deduplication processing, and stores '256' (GB) of garbage.

(4) Flow of Processing

Figure 12:
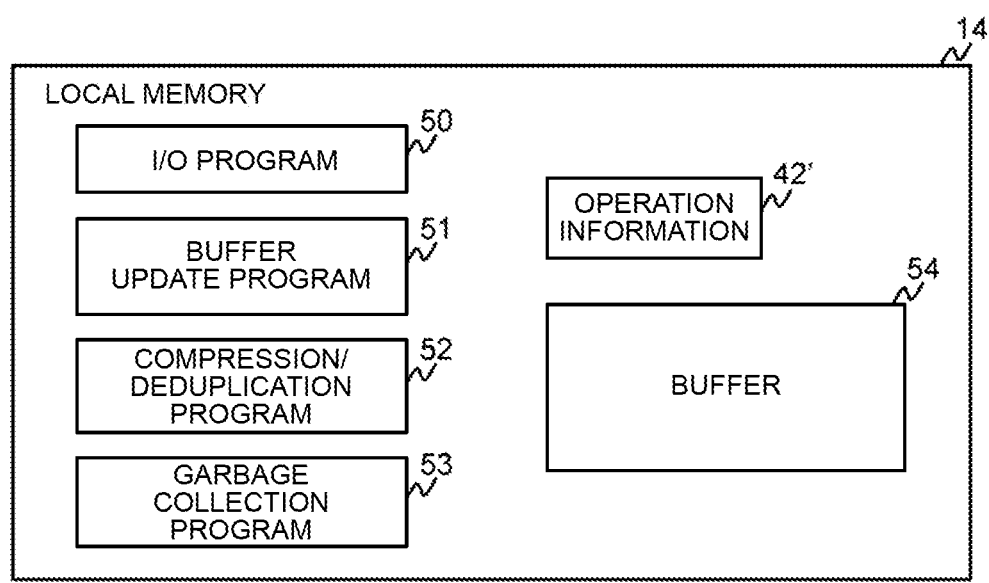

The flow of the various processing that is implemented by the storage apparatus 1 according to this embodiment will be explained next. As shown in FIG. 12, the local memory 14 of the storage apparatus 1 according to this embodiment stores at least an I/O program 50, a buffer update program 51, a compression/deduplication program 52, and a garbage collection program 53, and various processing which is explained hereinbelow is executed as a result of the CPU 13 executing these programs.

Operation information 42' is also stored in the local memory 14. The operation information 42' is information comprising a portion of the information which is stored in the virtual volume management table 42 (FIG. 6). Specifically, the operation information 42' has only information which is stored in the virtual page number field 42A and last update time field 42B among the records of the virtual volume management table 42. A diagram of this operation information 42' is therefore omitted from this specification.

A buffer 54 is also provided in the local memory 14. The buffer 54 is a memory area which is used by the CPU 13 to execute compression processing or expansion processing.

(4-1) Write Processing

The flow of write processing which is executed by the I/O program 50 will be explained first with reference to FIG. 13. Note that, in the ensuing explanation, the data size of write-target data is the same as one chunk (8 KB) and the start address of the write destination of the data designated by the write request coincides with the start address of the chunk.

Figure 13:
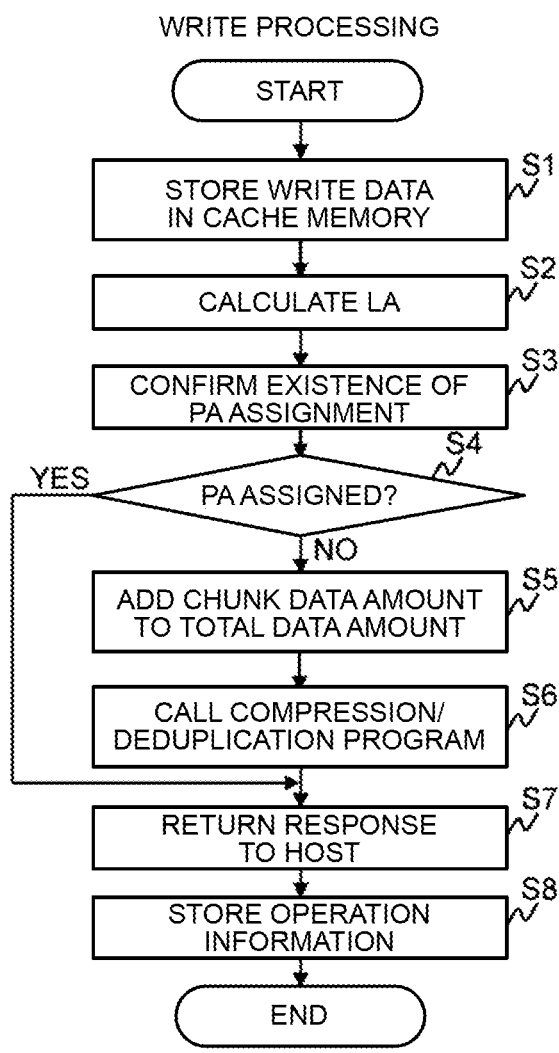
FIG. 13 is a flowchart showing the process steps of write processing.

Upon receiving a write request from the host 2, the I/O program 50 starts the write processing shown in FIG. 13 and foremost secures an area, for receiving the write-target data, in the cache memory 15, and stores the data in the secured area (S1). This processing is also executed by well-known storage apparatuses and hence a detailed explanation is omitted.

Accordingly, the I/O program 50 calculates the LA of the data write destination by using Equation (1) hereinabove from the address (LBA) designated as the data write destination in the write request (S2) and confirms whether a PA has been assigned to the area of the calculated LA (S3). Specifically, the I/O program 50 specifies the record in which the LA calculated in step S2 is stored in the LA field 44A from among the records of the LP conversion table 44 (FIG. 8) and confirms whether a valid value (a value other than null) has been stored in the PA field 44C of the record.

Thereafter, the I/O program 50 determines whether confirmation of a PA being assigned to the LA area was obtained in S2 (whether it was confirmed that a value other than null was stored in the PA field 44C corresponding to the LA) (S4).

Here, obtaining a negative result in this determination means that data has not yet been written to the area designated as the data write destination in the write request and that the data write is an initial data write. Thus, the I/O program 50 then updates the value which is stored in the total data amount field 48B (FIG. 11), of the record that corresponds to the pool to which the virtual volume designated as the data write destination in the write request belongs from among the records in the log-structured write overwrite condition management table 48 (FIG. 11), to a value which is obtained by adding the data amount of the selected chunk (the chunk selected in step S10 in FIG. 14) (S5).

Specifically, the compression/deduplication program 52 refers to the pool management table 41, specifies the record in which the virtual volume number of the virtual volume designated in the write request at the time is stored in the virtual volume number field 41B (FIG. 5), and acquires the pool number which is stored in the pool number field 41A (FIG. 5) of this record. The pool to which the pool number has been assigned is the pool to which the virtual volume designated in the write request belongs. The compression/deduplication program 52 then specifies the record in which the pool number acquired as described hereinabove is stored in the pool number field 48A (FIG. 11) from among the records of the log-structured write overwrite condition management table 48, and updates the value which is stored in the total data amount field 48B of the record to a value that is obtained by adding the data amount of the selected chunk.

Thereafter, the I/O program 50 calls the compression/deduplication program 52 (FIG. 12) (S6). The compression/deduplication program 52 which has been called by the I/O program 50 then executes compression/deduplication processing, described hereinbelow with respect to FIG. 14, on the write target data, and stores the data thus obtained, which has undergone the compression/deduplication processing, in the corresponding storage device 20.

In addition, the I/O program 50 sends back a response to the effect that the write request is complete to the host 2 which was the transmission source of the write request (S7). Furthermore, the I/O program 50 converts the address (LBA) designated as the data write destination in the write request to a virtual page number (hereinafter a virtual page number after conversion will be denoted by 'p') and stores the current time in the last update time field 42B (FIG. 6) of the record with the virtual page number 'p' which is stored in the virtual page number field 42A (FIG. 6) among the records in the virtual volume management table 42 (FIG. 6) which are held as operation information 42' (FIG. 12) in the local memory 14 (FIG. 12) (S8). The I/O program 50 then ends the write processing.

Thus, according to this embodiment, in the initial data write to a virtual page, the data is stored in the storage device 20 using the inline system (synchronous system). As a result, the storage capacity required for the storage apparatus 1 can be suppressed by the data amount after the data has undergone compression/deduplication processing, and the storage capacity required for the storage apparatus 1 can be suppressed in comparison with a case where a data write is performed using the post-process system.

However, obtaining an affirmative result in the determination of step S4 means that data has already been written to the area designated as the data write destination in the write request (that is, the data write is not an initial data write) and that the data has already undergone compression/deduplication processing and been migrated as a compressed chunk to the log-structured write space. Thus, the I/O program 50 then sends back a response to the effect that the write request is complete to the host 2 which was the transmission source of the write request (S7). Moreover, the I/O program processes step S8 as described hereinabove and then ends the write processing.

Note that the data which has been stored in the cache memory 15 is then subjected to compression/deduplication processing and written to the storage device 20 by the I/O program 50 asynchronously to the host I/O (S8). This processing is known as destaging. Upon destaging data which has been written to a virtual page, when a physical page has been assigned to the virtual page, the I/O program 50 destages the data to the storage device 20 which provides this physical page. Furthermore, when a physical page has not been assigned to the virtual page, the I/O program 50 destages the data after assigning a physical page to the virtual page prior to the destage. Details of this destage processing will be described hereinbelow.

Thus, according to this embodiment, in the second and subsequent data writes to the same one area of a virtual page, the data is stored in the storage device 20 using the post-process system (asynchronous system). Consequently, it is possible to improve the response performance of the storage apparatus 1 from the perspective of the host 2, in comparison with a case where all data writes are executed using the inline system.

(4-2) Compression/Deduplication Processing

Figure 14:
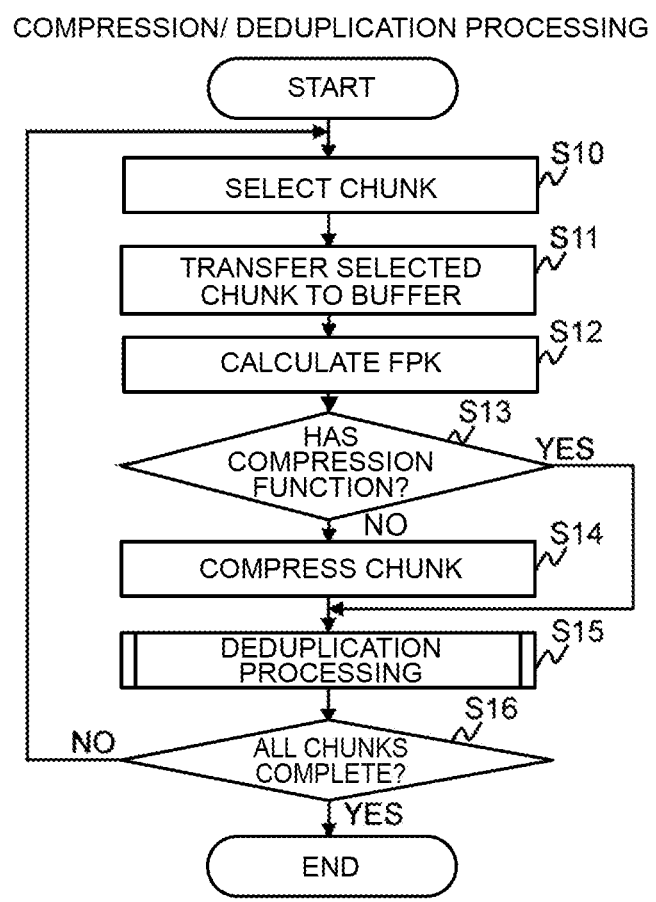
FIG. 14 is a flowchart showing the process steps of compression/deduplication processing.

FIG. 14 shows the flow of compression/deduplication processing which is executed by the compression/deduplication program 52 that has been called by the I/O program 50 in step S6 of FIG. 13.

Upon being called by the I/O program 50, the compression/deduplication program 52 starts the compression/deduplication processing shown in FIG. 14 and foremost partitions the write target data into 8 KB chunk units as required and selects one unprocessed chunk from among the chunks obtained by means of this partitioning (S10).

Furthermore, the compression/deduplication program 52 transfers the selected chunk (hereinafter called the selected chunk) to the buffer 54 (FIG. 12) of the local memory 14 (S11) and calculates the FPK of the selected chunk thus transferred to the buffer 54 (S12).

The compression/deduplication program 52 then specifies the address (PA) in the log-structured write space to which the compressed chunk of the selected chunk is to be written and determines whether the storage device 20 which is providing the physical page assigned to the log-structured write page that includes the PA is a compression-function storage device 20 (S13).

Specifically, the compression/deduplication program 52 refers to the log-structured write space mapping table 43 (FIG. 7) and calculates the next PA of the position where a compressed chunk was last written in the log-structured write space. The PA is the address in the log-structured write space to which the compressed chunk of the selected chunk was written. More specifically, by referring to the last write position field 41C (FIG. 5) of the corresponding record in the pool management table 41 (FIG. 5), the compression/deduplication program 52 specifies the log-structured write page number of the log-structured write page to which a compressed chunk was last written in the log-structured write space associated with the corresponding virtual volume. This log-structured write page number will be referred to as the 'AP1' hereinbelow.

Furthermore, the compression/deduplication program 52 specifies the record in which the log-structured write page number specified as described hereinabove is stored in the log-structured write page number field 43A from among the records of the log-structured write space mapping table 43 and acquires the last write position which is stored in the on-page last write position field 43D of this record. This record will be referred to as the 'AR1' hereinbelow.

Furthermore, the compression/deduplication program 52 uses the AP1 and AR1 obtained as described hereinabove to find the PA to which the compressed chunk of the selected chunk in the log-structured write space is to be written by means of the following equation:

[Equation 2]

$$AP1 \times \text{page size}(42\ MB) \div 512 + AR1 + 1 \qquad (2)$$

The compression/deduplication program 52 then preselects the physical page which is to be assigned to the log-structured write page including this PA. The compression/deduplication program 52 then refers to the page management table 40 (FIG. 4) and determines whether the storage device 20 providing the physical page has a compression function based on whether the value of the compression function existence flag, stored in the compression function existence flag field 40E of the record in which the physical page number of the physical page is stored in the physical page number field 40A, is '1.'

Here, when an affirmative result is obtained in the determination of step S13 (when the value of the compression function existence flag confirmed in step S13 is '1'), because the compression processing of the selected chunk can be left to the storage device 20 at the storage destination of the selected chunk, there is no need for the compression processing on the selected chunk to be executed in the storage controller 10. Thus, the compression/deduplication program 52 advances to step S15 without performing compression processing on the selected chunk.

If, on the other hand, a negative result is obtained in the determination of step S13, the compression processing of the selected chunk cannot be left to the storage device 20 at the storage destination of the selected chunk. Thus, the compression/deduplication program 52 then generates a compressed chunk by subjecting the selected chunk to compression processing (S14).

Thereafter, the compression/deduplication program 52 performs deduplication processing on the selected chunk by executing deduplication processing which will be described subsequently with reference to FIGS. 15A and 15B (S15) and then determines whether execution of the processing of steps S11 to S15 has finished for all the necessary chunks (S16).

Upon obtaining a negative result in this determination, the compression/deduplication program 52 returns to step S10 and then repeats the processing of steps S10 to S16 while sequentially replacing the chunk selected in step S10 (the selected chunk) with another unprocessed chunk. The compression/deduplication program 52 then ends the deduplication processing.

(4-3) Deduplication Processing

Figure 15A:
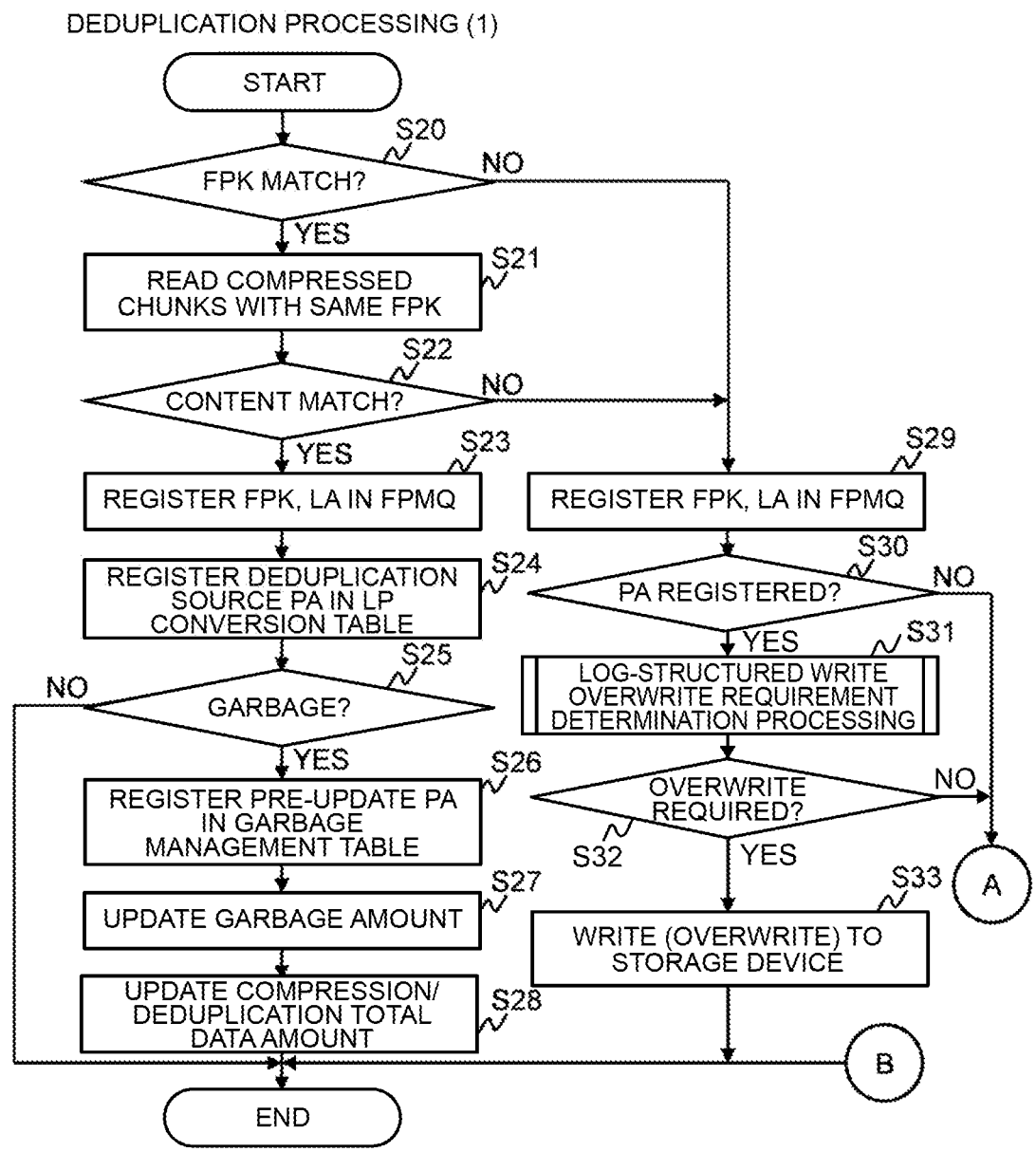
FIG. 15A is a flowchart showing the process steps of deduplication processing.
Figure 15B:
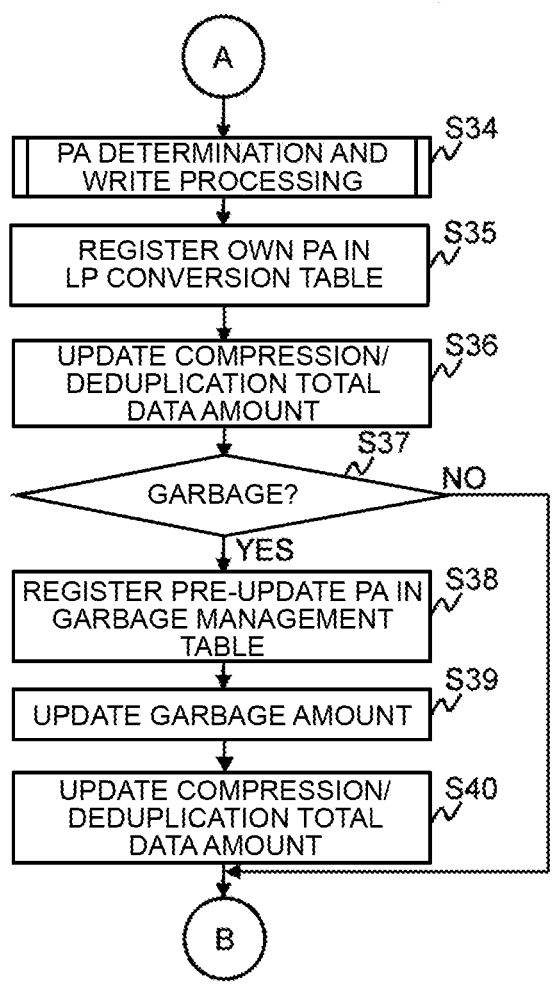
FIG. 15B is a flowchart showing the process steps of deduplication processing.

FIGS. 15A and 15B show the specific process steps of the deduplication processing which is executed by the compression/deduplication program 52 in step S15 of the compression/deduplication processing described hereinabove with reference to FIG. 14. The compression/deduplication program 52 executes the deduplication processing on the selected chunk according to the process steps shown in FIGS. 15A and 15B.

In reality, upon advancing to step S15 of the compression/deduplication processing, the compression/deduplication program 52 starts the deduplication processing shown in FIGS. 15A and 15B. The compression/deduplication program 52 then determines whether an FPK which is the same as the FPK calculated in step S12 of the compression/deduplication processing (FIG. 14) has been stored in the FPMQ 45 (FIG. 9) for the selected chunk (S20). This determination is made by exploring whether the record in which the FPK calculated in step S12 of the compression/deduplication processing has been stored in the FPK field 45A (FIG. 9) among the records of the FPMQ 45 by using the FPTD 46 (FIG. 9) as described hereinabove.

Upon obtaining an affirmative result in the determination of step S20, the compression/deduplication program 52 then reads the chunk (compressed chunk) which has the same FPK as the FPK calculated in step S20 of the compression/deduplication processing (FIG. 14) from the storage device 20 (S21).

Specifically, by referring to the FPMQ 45 and LP conversion table 44 (FIG. 8), the compression/deduplication program 52 foremost specifies the PA, and area length, where the chunk (compressed chunk) which holds the same FPK as the FPK calculated in step S12 of the compression/deduplication processing is stored. In the ensuing explanation, this chunk is called the duplicate candidate chunk, and the PA of the duplicate candidate chunk is 'PA1.' By referring to the log-structured write space mapping table 43 (FIG. 7), the compression/deduplication program 52 specifies the page number of the physical page where the duplicate candidate chunk is stored and, by referring to the page management table 40 (FIG. 4), specifies the storage device 20 providing the physical page where the duplicate candidate chunk is stored, and the address of the physical page in the storage device 20. The compression/deduplication program 52 then reads the duplicate candidate chunk from the storage device 20 thus specified.

The compression/deduplication program 52 then compares the content of the chunk (compressed chunk) read in step S21 with the content of the selected chunk and determines whether the two chunks match (S22). Note that in the event of a match, the selected chunk is compressed when the selected chunk has not been compressed, or the chunk read in step S21 is expanded, and then the chunks are compared in byte units.

Obtaining an affirmative result in this determination means that a chunk with the same content as the selected chunk has already been registered in the FPMQ 45. In this case, the compression/deduplication program 52 foremost registers the LA of the selected chunk in the FPMQ 45 in association with the FPK of the selected chunk. Moreover, the compression/deduplication program 52 stores '1' in the FPMQ registration field 44E (FIG. 8) of the records in which the LA stored in the LA field 44A (FIG. 8) matches the LA of the selected chunk, among the records in the LP conversion table 44 (FIG. 8) (S23).

Thereafter, the compression/deduplication program 52 stores the PA (that is, 'PA1') of the duplicate candidate chunk in the PA field 44C of the record in which the LA stored in the LA field 44A matches the LA of the selected chunk, among the records in the LP conversion table 44, and stores the data length of the duplicate candidate chunk in the length field 44D of the record (S24). In this case, the compressed chunk of the selected chunk is not stored in the log-structured write space.

The compression/deduplication program 52 then determines whether the selected chunk has undergone compression processing in step S14 of the compression/deduplication processing (FIG. 14) and whether the pre-update selected chunk or compressed chunk which is stored in the log-structured write space is garbage (S25). This determination is made by determining whether a compressed chunk of the selected chunk exists and whether the PA of the area of the log-structured write space in which the compressed chunk of the pre-update selected chunk is stored has been registered in the LP conversion table 44 in association with another LA. Specifically, the compression/deduplication program 52 specifies the record in which the LA of the selected chunk is stored in the LA field 44A from among the records of the LP conversion table 44 and acquires the PA stored in the PA field 44C of the record. The compression/deduplication program 52 then determines whether the acquired PA has been stored in the PA field 44C of a record other than the record specified as described hereinabove in the LP conversion table 44.

Here, obtaining a negative result in this determination means that the compressed chunk of the pre-update selected chunk stored in the log-structured write space has the same content as another compressed chunk that has been deleted by the deduplication processing, and because the compressed chunk of the pre-update selected chunk is also associated with another LA, the compressed chunk of the selected chunk cannot be deleted. Thus, the compression/deduplication program 52 then ends the deduplication processing.

If, on the other hand, an affirmative result is obtained in the determination of step S25, this means that the compressed chunk of the pre-update selected chunk stored in the log-structured write space is not associated with an LA other than the LA of the selected chunk and is garbage. Thus, the compression/deduplication program 52 then registers the PA where the compressed chunk of the pre-update selected chunk is stored in the garbage management table 47 (FIG. 10) in association with the data length of the compressed chunk of the pre-update selected chunk which is stored in the length field 44D of the record corresponding to the selected chunk in the LP conversion table 44 (S26).

The compression/deduplication program 52 then updates the value which is stored in the garbage amount field 48D (FIG. 11), of the record which corresponds to the pool that includes the physical page where the compressed chunk of the pre-update selected chunk is stored, from among the records in the log-structured write overwrite condition management table 48 (FIG. 11), to a value which is obtained by adding the data size of the compressed chunk of the pre-update selected chunk (S27).

Moreover, the compression/deduplication program 52 updates the value which is stored in the compression/deduplication total data amount field 48C of this record in the log-structured write overwrite condition management table 48 to a value that is obtained by subtracting the data size of the compressed chunk of the pre-update selected chunk (S28) and then ends this deduplication processing.

If, on the other hand, a negative result is obtained in the determination of step S20 or step S22, the compression/deduplication program 52 registers the LA of the selected chunk in the FPMQ 45 (FIG. 9) in association with the FPK of the selected chunk, as per step S23. Moreover, the compression/deduplication program 52 stores in the FPMQ registration field 44E of the records in which the LA of the selected chunk is stored in the LA field 44A, among the records in the LP conversion table 44 (S29).

Thereafter, the compression/deduplication program 52 determines whether a PA has been stored in the PA field 44C of the record where the LA of the selected chunk is stored in the LA field 44A, among the records in the LP conversion table 44 (whether the compressed chunk of the pre-update selected chunk has been stored in the log-structured write space) (S30).

Note that in the case of an initial data write to the chunk in the overwrite space, a negative result is obtained in step S4 of FIG. 13 and because the compression/deduplication processing of FIG. 14 and the deduplication processing of FIGS. 15A and 15B are executed by the compression/deduplication program 52 which is called in step S6, a negative result is invariably obtained in the determination of this step S30. In contrast, in the case of the second and subsequent data writes to the chunk in the overwrite space, an affirmative result is invariably obtained in step S30 of the deduplication processing shown in FIGS. 15A and 15B which are executed in the destage processing which will be described hereinbelow with reference to FIG. 18.

Thus, when a negative result is obtained in the determination of step S30, by executing the PA determination and write processing which will be described subsequently with reference to FIG. 16, the compression/deduplication program 52 writes the compressed chunk of the selected chunk stored in the buffer 54 (FIG. 12) to the storage device 20 after migrating the compressed chunk of the selected chunk to the log-structured write space (S34). Note that details of this PA determination and write processing will be described hereinbelow.

Thereafter, the compression/deduplication program 52 stores the PA in the log-structured write space, to which the compressed chunk of the selected chunk has been written in the PA determination and write processing of step S34, in the PA field 44C of the record in which the LA of the selected chunk is stored in the LA field 44A, among the records in the LP conversion table 44 (FIG. 8) (S35). Moreover, the compression/deduplication program 52 updates the value stored in the compression/deduplication total data amount field 48C of the record in which the pool number of the corresponding pool is stored in the pool number field 48A, among the records of the log-structured write overwrite condition management table 48 (FIG. 11), to a value that is obtained by adding the data size of the compressed chunk of the selected chunk (S36).

Moreover, as per step S25, the compression/deduplication program 52 determines whether the PA of the area of the log-structured write space where the compressed chunk of the pre-update selected chunk is stored has been registered in the LP conversion table in association with another LA (S37). Note that a negative result is obtained in this determination because, when the processing has reached step S38 via steps S34 to S36 after obtaining a negative result in step S30, the compressed chunk of the pre-update selected chunk has not been stored in the log-structured write space. Then, upon obtaining a negative result in step S37, the compression/deduplication program 52 ends the deduplication processing.

However, an affirmative result is obtained in step S37 when the processing has reached step S38 via steps S34 to S36 after obtaining a negative result in step S32. Thus, the compression/deduplication program 52 processes steps S38 to S40 in the same way as steps S26 to S28 described hereinabove, and then ends the deduplication processing.

If, on the other hand, an affirmative result is obtained in the determination of step S30, the compression/deduplication program 52 executes log-structured write overwrite necessity determination processing to determine whether it is necessary to overwrite the compressed chunk of the pre-update selected chunk stored in the log-structured write space with the compressed chunk of the post-update selected chunk (S31). Details of this log-structured write overwrite necessity determination processing will be described hereinbelow.

Furthermore, the compression/deduplication program 52 determines whether a determination of the necessity to overwrite the compressed chunk of the pre-update selected chunk stored in the log-structured write space with the compressed chunk of the post-update selected chunk has been obtained as the result of the log-structured write overwrite necessity determination processing of step S30 (S32). Then, upon obtaining a negative result in this determination, the compression/deduplication program 52 executes steps S34 to S40 as described hereinabove and ends the deduplication processing.

If, on the other hand, an affirmative result is obtained in the determination of step S32, the compression/deduplication program 52 acquires the PA which is stored in the PA field 44C (FIG. 8) of the record in which the LA of the selected chunk is stored in the LA field 44A (FIG. 8) from among the records of the LP conversion table 44 (FIG. 8), and stores the post-update selected chunk or the compressed chunk thereof, which is stored in the buffer 54 (FIG. 12) at the time, at the physical address indicated by the acquired PA (the corresponding area in the corresponding storage device) (S33). As a result, the compressed chunk of the pre-update selected chunk stored in the log-structured write space is overwritten with the compressed chunk of the post-update selected chunk. The compression/deduplication program 52 then ends the deduplication processing.

(4-4) PA Determination and Write Processing

Figure 16:
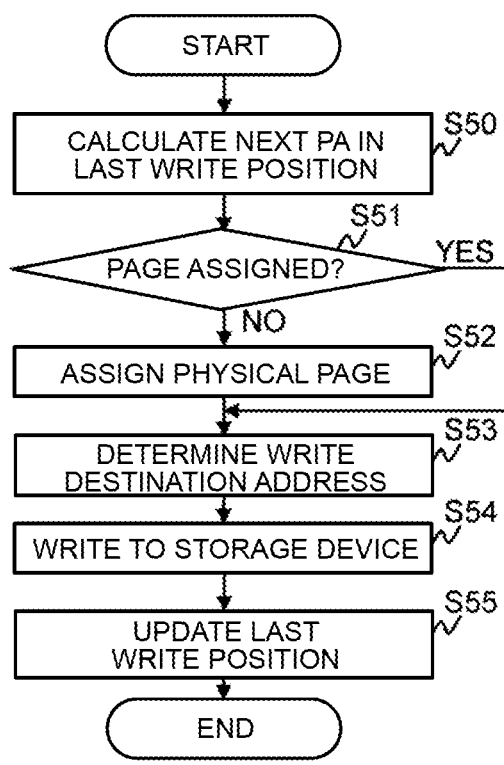
FIG. 16 is a flowchart showing the process steps of PA determination and write processing.

FIG. 16 shows the specific process steps of the PA determination and write processing which is executed by the compression/deduplication program 52 in step S34 of the deduplication processing described hereinabove with reference to FIGS. 15A and 15B. The compression/deduplication program 52 determines the PA in the log-structured write space which is to serve as the storage destination of the compressed chunk of the selected chunk stored in the buffer 54 (FIG. 12) and writes the compressed chunk of the post-update selected chunk to the PA, according to the process steps shown in FIG. 16.

In reality, upon advancing to step S34 of the deduplication processing, the compression/deduplication program 52 starts the PA determination and write processing shown in FIG. 16 and foremost calculates the PA following the position where the compressed chunk of a chunk was last written in the log-structured write space by means of the same method as the method described hereinabove with reference to step S13 of the compression/deduplication processing (FIG. 14) (S50). The PA is the address in the log-structured write space to which the compressed chunk of the selected chunk was written.

Specifically, by referring to the last write position field 41C (FIG. 5) of the corresponding record in the pool management table 41 (FIG. 5), the compression/deduplication program 52 specifies the log-structured write page number of the log-structured write page to which writing was last performed in the log-structured write space corresponding to the corresponding virtual volume. Here, the specified log-structured write page number is assumed to be 'AP1.' Furthermore, the compression/deduplication program 52 specifies the record in which the log-structured write page number specified as described hereinabove is stored in the log-structured write page number field 43A (FIG. 7) from among the records of the log-structured write space mapping table 43 (FIG. 7), and acquires the last write position which is stored in the on-page last write position field 43D (FIG. 7) of this record. Here, the acquired last write position is assumed to be 'AR1.'

Furthermore, the compression/deduplication program 52 uses the AP1 and AR1 obtained as described hereinabove to find the PA to which the compressed chunk of the selected chunk in the log-structured write space is to be written by means of Equation (2) hereinabove. In the ensuing explanation, the PA of the write destination of the compressed chunk of the selected chunk is determined as 'PA2,' and the length of the compressed chunk is assumed to be 'L2.'

The compression/deduplication program 52 then determines whether a physical page has been assigned to the log-structured write page which includes the PA (PA2) calculated in step S50 (S51). Specifically, the compression/deduplication program 52 finds the log-structured write page number of the log-structured write page which includes 'PA2' by dividing 'PA2' by the page size (42 MB). Here, the log-structured write page number thus found is assumed to be 'AP2.' Furthermore, by referring to the log-structured write space mapping table 43 (FIG. 7), the compression/deduplication program 52 determines whether a valid value (a value other than null) has been stored in the physical page number field 43B (FIG. 7) of the record in which 'AP2' is stored in the log-structured write page number field 43A (FIG. 7). When a valid value has been stored in the physical page number field 43B, a physical page has been assigned to the log-structured write page which includes the 'PA2.' Further, if an affirmative result is obtained in this determination, the compression/deduplication program 52 then advances to step S53.

If, on the other hand, a negative result is obtained in the determination of step S51, the compression/deduplication program 52 assigns a physical page to the log-structured write page (S52). Specifically, the compression/deduplication program 52 selects one record which corresponds to an unused physical page from the page management table 40 (FIG. 4) (a record in which '0' is stored in the use field 40D). Here, when executing the PA determination and write processing as a continuation of the compression/deduplication processing described hereinabove with reference to FIG. 14, the compression/deduplication program 52 selects the physical page which has been provisionally selected as described hereinabove in step S13 of the compression/deduplication processing.

Furthermore, the compression/deduplication program 52 stores the physical page number of the physical page which is stored in the physical page number field 40A (FIG. 4) of this record and the pool number of the pool to which the physical page belongs in the physical page number field 43B (FIG. 7 and pool number field 43C (FIG. 7) respectively of the record corresponding to this log-structured write page in the log-structured write space mapping table 43 (FIG. 7). Moreover, the compression/deduplication program 52 stores '1' in the use field 40D (FIG. 4) of the record selected as described hereinabove in the page management table 40.

Thereafter, by referring to the log-structured write space mapping table 43 and page management table 40, the compression/deduplication program 52 calculates the address in the storage area provided by the storage device 20 at the write destination of the compressed chunk of the selected chunk (S53). The compression/deduplication program 52 then writes the compressed chunk of the selected chunk to the address calculated in step S53 (S54).

Furthermore, the compression/deduplication program 52 stores the log-structured write page number of the log-structured write page to which the compressed chunk of the selected chunk has been written on this occasion in the last write position field 41C (FIG. 5) of the corresponding record in the pool management table 41 (FIG. 5) and stores a relative address in the log-structured write page where writing was last performed in the on-page last write position field 43D (FIG. 7) of the corresponding record in the log-structured write space mapping table 43 (FIG. 7) (S55). The compression/deduplication program 52 then ends the PA determination and write processing.

(4-5) Log-Structured Write Overwrite Necessity Determination Processing

In the storage apparatus 1 according to this embodiment, when data which has been written from the host 2 is written from the overwrite space to the log-structured write space after being compressed and this data is then updated, the data that was compressed before the update is essentially garbage (however, this excludes cases where the data is the only remaining data due to deduplication processing). Therefore, in the storage apparatus 1 according to this embodiment, by regularly executing garbage collection processing (FIG. 18), described subsequently, which discards the garbage present in the log-structured write space and pools, depletion of the log-structured write space and pool capacity due to garbage accumulation is prevented.

Meanwhile, when there is a rapid increase in data updates or when the data update frequency is high relative to the execution period of garbage collection processing, the garbage generation volume that is generated due to data updates is larger than the garbage discard volume that is generated due to garbage collection processing, and there is a risk of the pool becoming depleted.

To prevent this situation from arising, the storage apparatus 1 according to this embodiment is equipped with a function for suppressing the reception of I/O from the host 2 when the pool used capacity exceeds a preconfigured threshold (hereinafter called the pool used capacity threshold); however, there is a problem in that, when such I/O reception suppression is performed, there is a drop in the response performance of the storage apparatus 1 from the perspective of the host 2.

Therefore, the storage apparatus 1 according to this embodiment is equipped with a log-structured write overwrite function whereby, in a case where data has been updated by means of an I/O from the host 2, when the reception of I/O from the host 2 is suppressed or the pool is nearly depleted, the pre-update compressed data of the data which is present in the log-structured write space is overwritten with the post-update compressed data of this data.

Specifically, because the data compression processing and deduplication processing are executed in chunk units, it is determined (a log-structured write overwrite necessity determination) whether either of two conditions (hereinafter called the log-structured write overwrite conditions), which are (Condition 1) and (Condition 2) hereinbelow, is satisfied for each updated chunk, and for those chunks which satisfy at least one of the log-structured write overwrite conditions, a pre-update chunk or compressed chunk thereof which is present in the log-structured write space is overwritten with a post-update chunk or compressed chunk thereof.

(Condition 1) When the data size of the post-update compressed chunk of the chunk which is the target is equal to or less than the data size of the pre-update compressed chunk of this chunk, and the garbage amount (data amount of the garbage) in the pool (hereinafter called the target pool) where the chunk is to be stored is large. According to this embodiment, the following equation is established as a reference for determining that the 'garbage amount is large.'

[Equation 3]

$$\text{(Total data amount of pool)} \leq \text{(total data amount for post-compression/deduplication)} + \text{(garbage amount)} \quad (3)$$

Note that this condition means that the garbage amount in the pool is equal to or more than the difference between the total data amount before the compression/deduplication processing of each data item stored in the pool and the total data amount after the compression/deduplication processing of each data item stored in the pool.

(Condition 2) When the data size of the post-update compressed chunk of the chunk which is the target is no more than the data size of the pre-update compressed chunk of this chunk, and the used capacity of the target pool is equal to or more than a fixed volume.

According to this embodiment, the following equation is established:

[Equation 4]

$$\text{(Total data amount of pool)} \geq \text{(pool used capacity threshold)} \quad (4)$$

Figure 17:
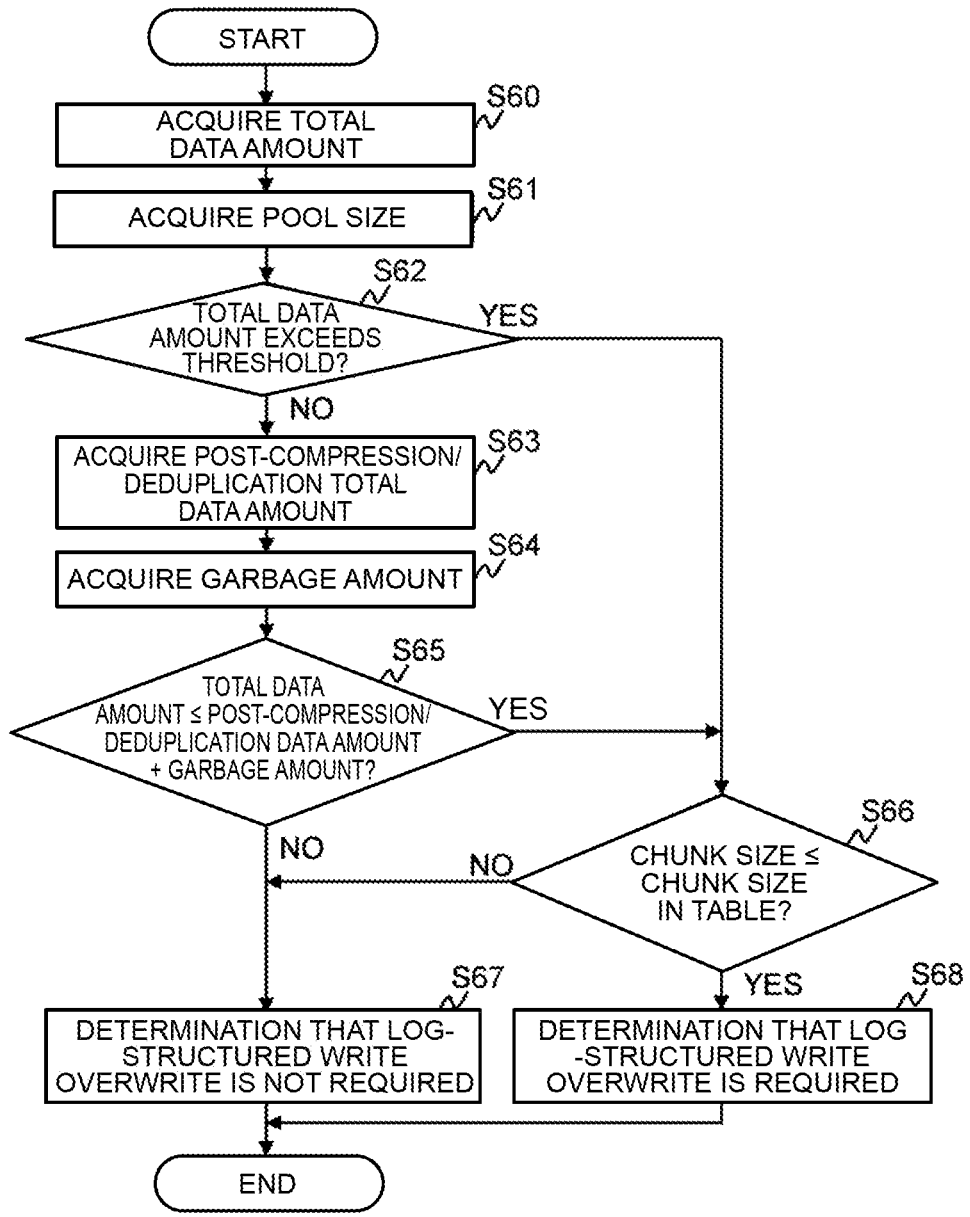
FIG. 17 is a flowchart showing the process steps of log-structured write overwrite necessity determination processing.

FIG. 17 shows the specific process steps of the log-structured write overwrite necessity determination processing which is executed by the compression/deduplication program 52 in step S31 of the deduplication processing described hereinabove with reference to FIGS. 15A and 15B in connection with this log-structured write overwrite function.

In reality, upon advancing to step S31 of the deduplication processing, the compression/deduplication program 52 starts the log-structured write overwrite determination processing shown in FIG. 17, and foremost refers to the log-structured write overwrite condition management table 48 (FIG. 11) to acquire the total data amount of the corresponding pool (S60). Specifically, the compression/deduplication program 52 specifies the record in which the pool number of the pool (hereinafter called the target pool) to which the write destination virtual volume of the chunk being targeted at this time (hereinafter called the target chunk) belongs is stored in the pool number field 48A (FIG. 11) from among the records of the log-structured write overwrite condition management table 48, and acquires the value which is stored in the total data amount field 48B (FIG. 11) of this record.

Thereafter, the compression/deduplication program 52 specifies the record in which the pool number of the target pool is stored in the pool number field 41A (FIG. 5), from among the records in the pool management table 41 (FIG. 5) and acquires the pool size (capacity) of the target pool which is stored in the pool size field 41D (FIG. 5) of this record (S61).

The compression/deduplication program 52 then determines whether the total data amount of the target pool acquired in step S61 exceeds the aforementioned pool used capacity threshold (S62). This pool used capacity threshold can be optionally configured by the user. For example, the pool used capacity threshold is configured by presetting the pool size (total capacity) of the pool at 80% and taking the value obtained by multiplying the pool size of the pool by 80% as the pool used capacity threshold.

Obtaining an affirmative result in this determination means that the condition that 'the used capacity of the target pool is equal to or more than a fixed volume' in (Condition 2) of the log-structured write overwrite conditions described hereinabove is satisfied. Thus, the compression/deduplication program 52 then advances to step S66.

However, obtaining a negative result in the determination of step S62 means that a state where the used capacity of the target pool is large has not yet been reached. Thus, the compression/deduplication program 52 acquires the total data amount after the compression/deduplication processing (hereinafter called the post-compression/deduplication processing total data amount), which is stored in the target pool, and the data amount of the garbage stored in the target pool from the log-structured write overwrite condition management table 48 (S63, S64).

Specifically, the compression/deduplication program 52 acquires the post-compression/deduplication processing total data amount which is stored in the compression/deduplication total data amount field 48C (FIG. 11) of the record corresponding to the target pool from among the records of the log-structured write overwrite condition management table 48 in step S63 and, in step S64, acquires the value stored in the garbage amount field 48D (FIG. 11) (hereinafter called the garbage amount) of this record.

Further, the compression/deduplication program 52 determines whether the value of the total data amount acquired in step S60 is equal to or less than the total of the post-compression/deduplication data amount acquired in step S63 and the garbage amount acquired in step S64 (S65).

Obtaining an affirmative result in this determination means that the condition that 'the garbage amount of the target pool is large' in (Condition 1) of the log-structured write overwrite conditions described hereinabove is satisfied. Thus, the compression/deduplication program 52 determines whether the data size of the compressed chunk of the post-update selected chunk is equal to or less than the data size of the compressed chunk of the pre-update selected chunk (S66).

Obtaining an affirmative result in this determination means that the condition that 'the data size of the post-update compressed chunk of the chunk is no more than the data size of the pre-update compressed chunk of the chunk' in (Condition 1) and (Condition 2) of the log-structured write overwrite conditions described hereinabove is satisfied and, as a result, the compressed chunk of the selected chunk satisfies either one of (Condition 1) and (Condition 2) of the log-structured write overwrite conditions. Thus, the compression/deduplication program 52 determines that it is necessary to overwrite the compressed chunk of the pre-update selected chunk stored in the log-structured write space with the compressed chunk of the post-update selected chunk (S68), and then ends the log-structured write overwrite necessity determination processing.

If, on the other hand, a negative result is obtained in the determination of step S65 or S66, this means that the compressed chunk of the selected chunk does not satisfy either of the log-structured write overwrite conditions (Condition 1) and (Condition 2). Thus, the compression/deduplication program 52 then determines that it is not necessary to overwrite the compressed chunk of the pre-update selected chunk stored in the log-structured write space with the compressed chunk of the post-update selected chunk (S67), and then ends the log-structured write overwrite necessity determination processing.

(4-6) Destage Processing

Figure 18:
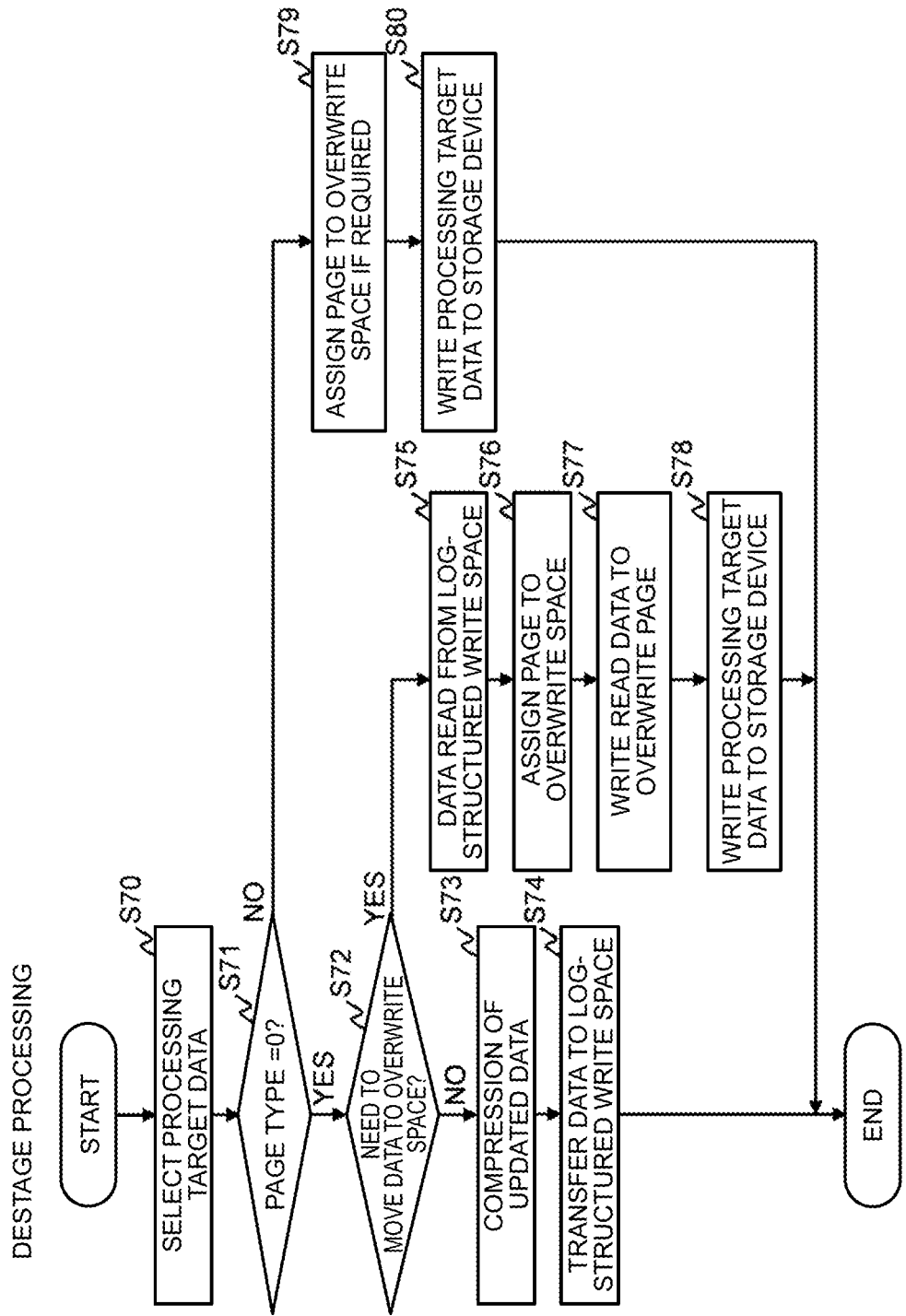
FIG. 18 is a flowchart showing the process steps of destage processing.

FIG. 18 shows the process steps of destage processing which is executed regularly by the I/O program 50. As described hereinabove, in the storage apparatus 1 according to this embodiment, in the case of an initial data write to a certain area of the virtual volume (a certain LA in the overwrite space), data is stored in the storage device 20 synchronously to the host I/O by means of the inline system.

Meanwhile, in the case of second and subsequent data writes (that is, at the time of data updates) to the same area of a virtual volume, the post-process system is applied, and therefore the write target data remains in the cache memory 15 (FIG. 1) without being compressed or deduped. Therefore, in the storage apparatus 1, as a result of the I/O program 50 regularly executing the destage processing shown in FIG. 18, the data which remains in the cache memory 15 is destaged to the storage device 20 while performing deduplication processing and, where necessary, compression processing when storage-destination storage device 20 does not have a compression function).

In reality, upon starting the destage processing, the I/O program 50 first selects the data of the processing target (hereinafter called the processing target data) from among the destage target data (update data) which is stored in the cache memory 15 (S70). A variety of methods can be applied as the method of selecting the processing target data. For example, there exists a method of selecting the data which was written from the host 2 at the oldest time. In this case, the storage controller 10 (FIG. 1) must store the time each data item stored in the cache memory 15 was written from the host 2. An example of a case where one chunk's worth of data is selected here is explained hereinbelow. However, as a further embodiment, a plurality of chunks, for instance, a plurality of consecutive chunks in a virtual volume may be selected.

Thereafter, the I/O program 50 specifies a write destination virtual page (hereinafter called a write destination virtual volume) for the processing target data selected in step S70. The I/O program 50 then determines whether the value, which is stored in the page type field 42C (FIG. 6) of the record in which the virtual volume number of the write destination virtual volume is stored in the virtual page number field 42A (FIG. 6), among the records of the virtual volume management table 42 (FIG. 6), is '0' (S71).

Obtaining an affirmative result in this determination means that the processing target data has already undergone compression/deduplication and been migrated to the overwrite space. Thus, the I/O program 50 determines whether the data has been returned to the overwrite space once again (S72). In a case where approximately all the chunks in the write destination virtual page are updated, for example, there is a possibility that the data stored in the write destination virtual page will then be updated frequently, and when data is compressed and stored for each destage, there is a large write processing overhead. Therefore, in such a case, the I/O program 50 determines that the data of the virtual page which has been migrated to the log-structured write space will be returned to the overwrite space once again. However, this determination method is an example, and another determination method may be employed to determine whether to return data of the virtual page which has been migrated to the log-structured write space to the overwrite space.

Furthermore, upon obtaining a negative result in the determination of step S72, the I/O program 50 compresses the processing target data only when the storage device 20 of the storage destination of the processing target data does not have a compression function (373). The processing content of the I/O program 50 in step S73 is the same as steps S11 to S14 of FIG. 14. Therefore, the I/O program 50 also calculates the FPK of the processing target data at this time.

Moreover, the I/O program 50 stores the compressed processing target data (compressed chunk) in the log-structured write space (S74). This processing is the same processing as step S15 (FIGS. 15A and 15B) in FIG. 14. Note that, when the processing has advanced to step S30 in FIG. 15A, the I/O program 50 executes the processing of step S31 and subsequent steps invariably by obtaining an affirmative result in the determination of step S30 when the storage destination of the processing target data is not a storage device 20 which comprises a compression function. The I/O program 50 then ends the destage processing.

If, on the other hand, an affirmative result is obtained in the determination of step S72, the I/O program 50 reads all of the data of the write destination virtual page, which has been migrated to the log-structured write space, from the storage device 20 and temporarily stores the data thus read in the cache memory 15 (FIG. 1) after expanding this data (S75).

The I/O program 50 then assigns a physical page to the write destination virtual page (S76). Specifically, the I/O program 50 selects one unused physical page from the page management table 40 (FIG. 4) and stores the physical page number of the physical page and the pool number of the pool to which the physical page belongs in the physical page number field 42D (FIG. 6) and pool number field 42E (FIG. 6) respectively of the record in which the virtual volume number of the write destination virtual volume has been stored in the virtual page number field 42A (FIG. 6), among the records of the virtual volume management table 42 (FIG. 6). Moreover, the I/O program 50 stores '1' in the use field 40D (FIG. 4) of the record in which the physical page number of the physical page selected as described hereinabove is stored in the physical page number field 40A (FIG. 4), among the records of the page management table 40.

Thereafter, the I/O program 50 stores the data which has been read in step S75 to the physical page assigned to the write destination virtual page (S77). Specifically, the I/O program 50 acquires the device number and address which have been stored in the device number field 40B (FIG. 4) and address field 40C (FIG. 4) respectively of the record which corresponds to the physical page assigned to the write destination virtual page (the record in which the physical page number of the physical page has been stored in the physical page number field 40A), among the records of the page management table 40. The I/O program 50 then stores the data which has been read in step S75 in the address position of the storage device 20 to which the device number has been assigned.

The I/O program 50 then overwrites the physical page assigned to the write destination virtual page with the processing target data (S78) and then ends the destage processing.

If, on the other hand, a negative result is obtained in the determination of step S71, when a physical page has not been assigned to the write destination virtual page, the I/O program 50 assigns a physical page to the write destination virtual page in the same way as step S76 (S79). However, when a physical page has already been assigned to the write destination virtual page, there is no need to reassign a physical page.

Thereafter, the I/O program 50 overwrites the physical page (the corresponding storage device 20), which has been assigned to the write destination virtual page, with the processing target data as per step S78 (S80), and then ends the destage processing.

(4-7) Garbage Collection Processing

Figure 19:
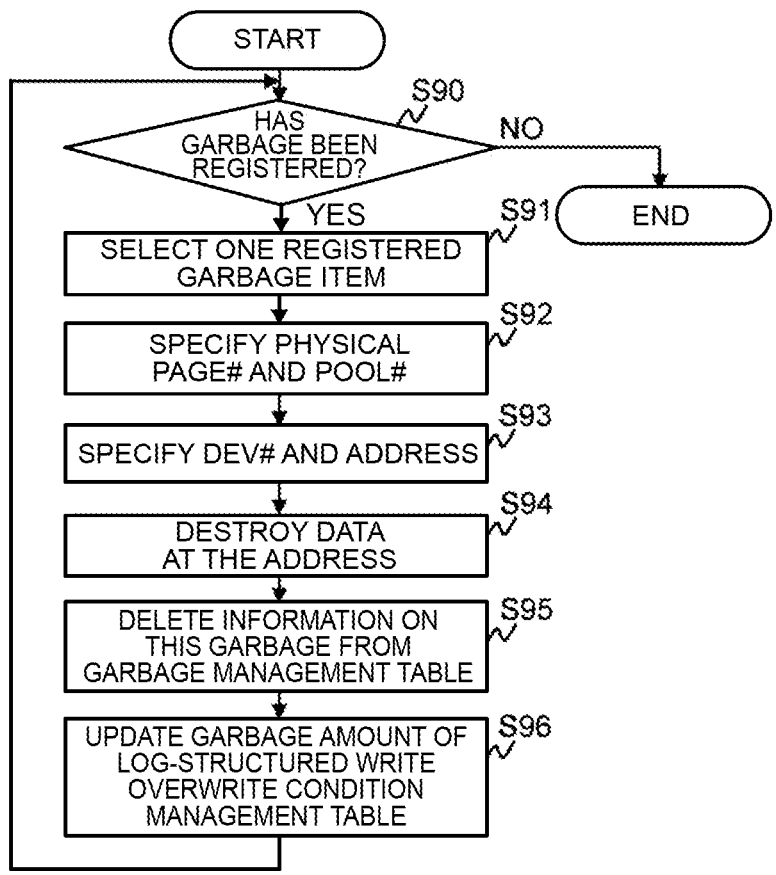
FIG. 19 is a flowchart showing the process steps of garbage collection processing.

Meanwhile, FIG. 19 shows the process steps of garbage collection processing which is executed regularly by the garbage collection program 53. The garbage collection program 53 regularly discards garbage that is stored in pools and recycles storage areas which are used by the pools according to these process steps.

In reality, upon starting the garbage collection processing shown in FIG. 19, the garbage collection program 53 foremost determines whether garbage has been registered by referring to the garbage management table 47 (FIG. 10) (S90). Further, upon obtaining an affirmative result in this determination, the garbage collection program 53 selects one garbage item which has been registered in the garbage management table 47 (S91).

Thereafter, the garbage collection program 53 specifies the physical page number of the physical page where the garbage selected in step S91 in the garbage management table 47 is stored, and the pool number of the pool to which the physical page belongs (S92).

Specifically, the garbage collection program 53 refers to the garbage management table 47 and acquires the PA stored in the PA field 47A and data length stored in the length field 47B of the record which corresponds to the garbage selected in step S91. Here, it is assumed in the explanation that a value 'PA2' is obtained as this PA. Further, the garbage collection program 53 executes the computation given by the following equation and calculates the page number of the log-structured write page (the log-structured write page number) where the garbage is stored based on the arithmetic result.

[Equation 5]

$$PA2 \times 512/42 \text{ MB} \quad (4)$$

Furthermore, the garbage collection program 53 acquires the physical page number and pool number which are stored in the physical page number field 43B and pool number field 43C respectively of the record where the log-structured write page number calculated at this time is stored in the log-structured write page number field, among the records of the log-structured write space mapping table 43 (FIG. 7). The physical page number is a physical page number of the physical page where the garbage selected in step S91 is stored, and the pool number is the pool number of the pool to which the physical page belongs.

Thereafter, the garbage collection program 53 acquires the device number of the storage device 20 storing the garbage which was selected in step S91 and the address of the storage area where the garbage is stored in the storage device 20 from the page management table 40 (FIG. 4) based on the physical page number and pool number which were specified in step S92 (S93). Specifically, the garbage collection program 53 specifies the record in which the physical page number specified in step S92 is stored in the physical page number field 40A (FIG. 4) from among the records in the page management table 40, and acquires the device number which is stored in the device number field 40B (FIG. 4) of this record and the address which is stored in the address field 40C (FIG. 4) of this record.

Thereafter, the garbage collection program 53 controls the storage device 20 to delete the data (garbage) which is stored at the address acquired in step S93 in the storage device 20 to which the device number acquired in step S93 has been assigned (S94). Note that the data length of the data (garbage) that is deleted at this time is the data length which is stored in the length field 47B (FIG. 10) of the record which corresponds to the garbage selected in step S91 in the garbage management table 47 (FIG. 10).

Moreover, the garbage collection program 53 deletes the information of the record which corresponds to the garbage selected in step S91 in the garbage management table 47 (S95) and updates the value which is stored in the garbage amount field 48D (FIG. 11) in the record of the corresponding pool in the log-structured write overwrite condition management table 48 (FIG. 11) to a value obtained by subtracting the data amount of the garbage selected in step S91 at the time (S96).

Further, the garbage collection program 53 then returns to step S90 and repeats the processing of steps S90 to S96 until a negative result is obtained in step S90. Further, upon obtaining an affirmative result in step S90 as a result of already finishing to execute the processing of steps S92 to S96 for all the garbage that has been registered in the garbage management table 47 (FIG. 10), the garbage collection program 53 ends this garbage collection processing.

(5) Effect of this Embodiment

As described hereinabove, in the storage apparatus 1, in a case where the data size of the post-update compressed chunk of the target chunk is no more than the data size of the pre-update compressed chunk of this chunk and the garbage amount in the target pool is large ('Condition 1' of the log-structured write overwrite conditions) or a case where the data size of the post-update compressed chunk of the target chunk is no more than the data size of the pre-update compressed chunk of this chunk and the used capacity of the target pool is equal to or more than a fixed volume ('Condition 2' of the log-structured write overwrite conditions), the compressed chunk of the pre-update chunk that is stored in the log-structured write space is overwritten with the compressed chunk of the post-update chunk.

Therefore, according to this storage apparatus 1, the generation of garbage at the time of data updates can be curbed and, as a result, pool depletion due to an increase in garbage can be suppressed. Accordingly, even when the data update frequency is high relative to the execution period of garbage collection processing, the generation of a situation where the reception of I/O from the host 2 is restricted can be suppressed, and a drop in the response performance of the storage apparatus from the perspective of the host can also be prevented while preventing pool depletion due to garbage generation.

Note that another method in which, when the data size of the post-update compressed chunk of the target chunk is no more than the data size of the pre-update compressed chunk of this chunk, the compressed chunk of the pre-update data that has been migrated to the log-structured write space is always overwritten with the compressed chunk of the post-update data, may also be considered.

Meanwhile, according to such a method, the compressed chunk of the post-update data that has overwritten the compressed chunk of the pre-update data is scattered in the log-structured write space and there is a risk of it no longer being possible to store the data in the log-structured write space sequentially to the storage device 20. Further, in such a case, the effect which is obtained by introducing the log-structured write space, according to which the data read/write speed from/to the storage device 20 can be improved by storing the data stored in the log-structured write space sequentially to the storage device 20, is hard to obtain.

Therefore, according to this embodiment, overwriting of the log-structured write space is permitted only when the log-structured write overwrite conditions are satisfied as described hereinabove and, as a result, a drop in the read/write speed from/to the storage device 20 of data that is stored in the log-structured write space can be suppressed as much as possible.

Moreover, in the storage apparatus 1, data write processing is performed by means of the inline system (synchronous system) at the time of an initial data write to an area in a virtual volume, and data write processing is performed by means of the post-process system (asynchronous system) when performing second and subsequent data writes to the area. Therefore, according to this storage apparatus 1, the storage capacity which is to be prepared for storage apparatus 1 need essentially only be the data amount after the compression/deduplication processing, and when a storage apparatus is being replaced or the like, for instance, the storage capacity that should be prepared beforehand for the new storage apparatus 1 can be reduced, and it is therefore also possible to obtain an effect of being able to curb the costs of introducing the new storage apparatus 1.

Moreover, in the storage apparatus 1, a storage device 20 equipped with a compression function is installed, and the data which has been migrated to the log-structured write space (data which has not been compressed), which is stored in the compression-function storage device 20, always satisfies the condition that 'the data size of the post-update compressed chunk of the target chunk is no more than the data size of the pre-update compressed chunk of the chunk' in (Condition 1) and (Condition 2) of the log-structured write overwrite conditions, and hence the data is highly likely to satisfy the log-structured write overwrite conditions and, to the same extent, the possibility of the pre-update data in the log-structured write space being overwritten with the post-update data is high. Thus, it is possible to curb the extent to which the pre-update data in the log-structured write space and pool becomes garbage and, to the same extent, further a drop in the response prevent performance of the storage apparatus from the perspective of the host while preventing pool depletion due to a garbage increase.

(6) Other Embodiments

An embodiment of the present invention was explained hereinabove but is merely an example to explain the present invention, there being no intention to limit the scope of the present invention to this embodiment alone. In other words, the present invention can also be embodied in a variety of other forms. For example, although a case where the storage apparatus 1 comprises two types of memory, namely, the local memory 14 and cache memory 15 was described in the foregoing embodiment, the present invention is not limited to or by such a case, rather, the storage apparatus 1 may be configured comprising only either one of the local memory 14 and cache memory 15. In this case, all of the information is stored in the local memory or cache memory.

Moreover, although a case where several information items which are used by the storage apparatus 1 are managed in a table structure (see FIGS. 4 to 11) was described in the foregoing embodiment, the present invention is not limited to or by such a case, rather, a data structure other than a table, for instance a list structure or the like, may also be used to manage the information.

Note that, although a case where the present invention is applied to a storage apparatus 1 which is equipped with a compression function and a deduplication function was described in the foregoing embodiment, the present invention is not limited to or by such as case and can also be applied to a storage apparatus which is equipped only with a compression function.

Moreover, although a case where the pool used capacity threshold was a fixed proportion of the total pool capacity (80%, for example) was described in the foregoing embodiment, the present invention is not limited to or by such a case, rather, a fixed capacity may be configured as the pool used capacity threshold irrespective of the pool capacity, for example, and a variety of other configuration methods can be widely used as the method of configuring the pool used capacity threshold.

The present invention relates to a storage apparatus and a method of controlling same and can be widely applied to storage apparatuses of various configurations which are equipped with a data compression/deduplication function.

What is claimed is:

1. A storage apparatus which provides a virtual storage space to a host, comprising:
    a pool comprising a storage device; and
    a processor that is communicatively coupled with the pool and with a host, the processor configured to:
        manage a log-structured virtual write space,
        compress data of a compression target among data which has been written to a virtual storage space by the host,
        log the post-compression data in the log-structured virtual write space, and
        write the logged post-compression data to the storage device,
    wherein, when a used capacity of the pool is at or above a threshold, the processor is configured to restrict reception of a write request from the host, and
    wherein, on a condition that the logged data in the log-structured virtual write space has been updated, the processor is configured to overwrite pre-update post-compression logged data in the log-structured virtual write space with compressed data of the post-update data.

2. The storage apparatus according to claim 1,
    wherein, when the logged data in the log-structured virtual write space is updated and the compressed data of the post-update data has been logged in the log-structured virtual write space, the processor is configured to manage the pre-update post-compression data stored in the log-structured virtual write space as garbage, and
    wherein the processor is configured to overwrite the pre-update post-compression data stored in the log-structured virtual write space with the compressed data of the post-update data when either:
        a data size of the compressed data of the post-update data is no more than a data size of the pre-update post-compression data stored in the log-structured virtual write space and a data size of the garbage in the pool is equal to or more than the difference between a pre-compression total data amount stored in the pool and a post-compression total data amount stored in the pool, or
        when the data size of the compressed data of the post-update data is no more than the data size of the pre-update post-compression data stored in the log-structured virtual write space and the used capacity of the pool is equal to or more than the threshold.

3. The storage apparatus according to claim 2,
    wherein the processor is configured to write data to the storage device synchronously to an initial data write from the host to a same area of the virtual storage space and write data to the storage device asynchronously to second and subsequent data writes.

4. The storage apparatus according to claim 3,
    wherein a portion of the storage devices comprises a compression function for compressing stored data and storing and holding same, and
    wherein data which is stored in the storage device is supplied from the virtual storage space to the storage device without being compressed and logged in the log-structured virtual write space.

5. A method of controlling a storage apparatus which provides a virtual storage space to a host, the storage apparatus comprising a pool comprising a storage device, and a processor that is communicatively coupled with the virtual storage space and with a host, the processor configured to manage a log-structured virtual write space, compress data of a compression target among data which has been written to the virtual storage space by the host and log the compressed data in the log-structured virtual write space, and write the post-compression data which has been logged in the log-structured virtual write space to the storage device, the processor configured to restrict reception of a write request from the host when a used capacity of the pool is at or above a threshold, the method comprising:
    a first step in which, when the data logged in the log-structured virtual write space has been updated, the processor is configured to determine whether a predetermined condition is satisfied; and
    a second step in which, when the predetermined condition is satisfied, the processor is configured to overwrite the logged compressed pre-update data in the log-structured virtual write space with compressed post-update data.

6. The method of controlling a storage apparatus according to claim 5,
    wherein, when the logged data in the log-structured virtual write space is updated and the post-update compressed data has been logged in the log-structured virtual write space, the pre-update compressed data in the log-structured virtual write space is managed as garbage, and
    wherein, in the first step, the processor is configured to determine that the predetermined condition is satisfied when a data size of the post-update data is no more than a data size of the pre-update compressed data stored in the log-structured virtual write space and a data amount of the garbage in the pool is equal to or more than the difference between a pre-compression total data amount stored in the pool and a post-compression total data amount stored in the pool, or when the data size of the post-update compressed data is no more than the data size of the pre-update compressed data stored in the log-structured virtual write space and the used capacity of the pool is equal to or more than the threshold.

7. The method of controlling a storage apparatus according to claim 6,
    wherein the processor is configured to write data to the storage device synchronously to an initial data write from the host to a same area of the virtual storage space and write data to the storage device asynchronously to second and subsequent data writes.

8. The method of controlling a storage apparatus according to claim 7,
    wherein the storage device comprises a compression function for compressing, storing, and holding stored data, and wherein data stored in the storage device is supplied from the virtual storage space to the storage device without being compressed and logged in the log-structured virtual write space.

\* \* \* \* \*